US012255415B2

(12) United States Patent
Li et al.

(10) Patent No.: US 12,255,415 B2
(45) Date of Patent: Mar. 18, 2025

(54) BOARD-TO-BOARD SOCKET AND BOARD-TO-BOARD CONNECTOR ASSEMBLY

(71) Applicant: SHENZHEN EVERWIN PRECISION TECHNOLOGY CO., LTD., Guangdong (CN)

(72) Inventors: Yingyue Li, Guangdong (CN); Gang Tian, Guangdong (CN); Yiping Shi, Guangdong (CN); Yayong Li, Guangdong (CN); Xinyun Peng, Guangdong (CN)

(73) Assignee: SHENZHEN EVERWIN PRECISION TECHNOLOGY CO., LTD., Shenzhen (CN)

( * ) Notice: Subject to any disclaimer, the term of this patent is extended or adjusted under 35 U.S.C. 154(b) by 361 days.

(21) Appl. No.: 17/930,859

(22) Filed: Sep. 9, 2022

(65) Prior Publication Data

US 2023/0006381 A1 Jan. 5, 2023

Related U.S. Application Data

(63) Continuation of application No. PCT/CN2020/141926, filed on Dec. 31, 2020.

(30) Foreign Application Priority Data

Mar. 13, 2020 (CN) ......................... 202010176129.3
Mar. 13, 2020 (CN) ......................... 202010176143.3
(Continued)

(51) Int. Cl.
*H01R 12/71* (2011.01)
*H01R 13/11* (2006.01)
(Continued)

(52) U.S. Cl.
CPC ........... *H01R 12/716* (2013.01); *H01R 13/11* (2013.01); *H01R 13/24* (2013.01); *H01R 13/502* (2013.01); *H01R 13/629* (2013.01)

(58) Field of Classification Search
CPC ...... H01R 12/716; H01R 13/11; H01R 13/24; H01R 13/502; H01R 13/629
(Continued)

(56) References Cited

U.S. PATENT DOCUMENTS

2010/0130068 A1 5/2010 Peng
2013/0084717 A1 4/2013 Huang et al.
(Continued)

FOREIGN PATENT DOCUMENTS

CN 102570106 A 7/2012
CN 205178062 U 4/2016
(Continued)

OTHER PUBLICATIONS

English Translation of the Japanese Office Action mailed on Aug. 10. 2023, issued in the corresponding Japanese Application No. 2022-552599, 6 pages.

(Continued)

*Primary Examiner* — Phuong K Dinh
(74) *Attorney, Agent, or Firm* — W&G Law Group

(57) ABSTRACT

Provided is a board-to-board socket, including a socket body, socket terminal, and socket strengthener. The socket body includes a bottom wall, socket side walls, socket guide parts formed at lateral ends of the socket body, and an island part protruding upwards from the bottom wall. Socket guide parts each include a plug guide part receiving cavity, longitudinal outer peripheral wall, and lateral outer peripheral walls. The socket strengthener includes a main body part, lateral outer peripheral wall, and elastic arm parts. Tops of the elastic arm parts bend and extend towards longitudinal
(Continued)

outer sides to form hitching part cavities hitched on top faces of the lateral outer peripheral walls.

20 Claims, 21 Drawing Sheets

(30) Foreign Application Priority Data

Mar. 13, 2020 (CN) ......................... 202010176170.0
Mar. 13, 2020 (CN) ......................... 202010176952.4

(51) Int. Cl.
*H01R 13/24* (2006.01)
*H01R 13/502* (2006.01)
*H01R 13/629* (2006.01)

(58) Field of Classification Search
USPC ............................................................ 439/74
See application file for complete search history.

(56) References Cited

U.S. PATENT DOCUMENTS

| | | | | |
|---|---|---|---|---|
| 2016/0268732 A1* | 9/2016 | Arichika | ............ | H01R 13/6271 |
| 2018/0358729 A1 | 12/2018 | Chen et al. | | |
| 2023/0009513 A1* | 1/2023 | Chen | ...................... | H01R 13/46 |

FOREIGN PATENT DOCUMENTS

| | | | |
|---|---|---|---|
| CN | 108649356 | A | 10/2018 |
| CN | 108682990 | A | 10/2018 |
| CN | 108682991 | A | 10/2018 |
| CN | 108879145 | A | 11/2018 |
| CN | 208423285 | U | 1/2019 |
| CN | 109638523 | A | 4/2019 |
| CN | 109888536 | A | 6/2019 |
| CN | 209516069 | U | 10/2019 |
| CN | 209692066 | U | 11/2019 |
| CN | 209860189 | U | 12/2019 |
| CN | 210074208 | U | 2/2020 |
| CN | 111355061 | A | 6/2020 |
| CN | 111355062 | A | 6/2020 |
| CN | 111355063 | A | 6/2020 |
| CN | 111355064 | A | 6/2020 |
| CN | 211957987 | U | 11/2020 |
| CN | 212062736 | U | 12/2020 |
| CN | 212062737 | U | 12/2020 |
| CN | 212412242 | U | 1/2021 |
| JP | 5196648 | B2 | 5/2013 |
| JP | 2015207557 | A | 11/2015 |
| JP | 2018078072 | A | 5/2018 |
| KR | 20190000684 | A | 1/2019 |
| KR | 20190061351 | A | 6/2019 |

OTHER PUBLICATIONS

English translation of International Search Report mailed on Apr. 8, 2021, issued in corresponding International Application No. PCT-CN2020/141926, filed on Dec. 31, 2020, 3 pages.

English translation of the Japanese Notice of Allowance mailed on Jan. 12, 2024, issued in the corresponding Japanese Patent App. No. 2022-552599, 5 pages.

First Chinese Office Action mailed on Apr. 19, 2024, issued in Chinese Application No. 202010176143.3, entitled "Board-to-Board Socket,"; Applicant Shenzhen Municipal Precision Technology Co., Ltd.; 13 pages.

First Chinese Office Action mailed on May 31, 2024, issued in Chinese Application No. 202010176170.0, entitled "Board-to-Board Connector Assembly"; Applicant Shenzhen Municipal Precision Technology Co., Ltd.; 12 pages.

Chinese Office Action mailed Jul. 26, 2024, issued in related Chinese Application No. 202010176952.4; 9 pages.

"Series-parallel conversion connector for charging lithium battery of electric bicycle," Patent Technology, China Academic Journal Electronic Publishing House; 2007; 2 pages.

First Chinese Office Action mailed on Jun. 27, 2024, issued in Chinese Application No. 202010176129.3, filed on Mar. 13, 2020; 13 pages.

* cited by examiner

BOARD-TO-BOARD SOCKET AND BOARD-TO-BOARD CONNECTOR ASSEMBLY

CROSS-REFERENCES TO RELATED APPLICATIONS

The present application is a continuation of International Patent Application No. PCT/CN2020/141926, titled “BOARD-TO-BOARD SOCKET AND BOARD-TO-BOARD CONNECTOR ASSEMBLY”, filed on Dec. 31, 2020, which claims priority to: Chinese Patent Application No. 202010176170.0, titled “BOARD-TO-BOARD CONNECTOR ASSEMBLY”; Chinese Patent Application No. 202010176129.3, titled “BOARD-TO-BOARD SOCKET”; Chinese Patent Application No. 202010176952.4, titled “BOARD-TO-BOARD CONNECTOR ASSEMBLY”; and Chinese Patent Application No. 202010176143.3, titled “BOARD-TO-BOARD SOCKET”, all filed on Mar. 13, 2020, the entire contents of which are incorporated herein by reference.

TECHNICAL FIELD

The present application relates to the field of connectors, and in particular, to a board-to-board socket and a board-to-board connector assembly.

BACKGROUND

Board-to-board connector assemblies are widely used in the field of consumer electronics, such as smart phones, tablets, and wearable devices. Current smart phones and wearable devices have extremely high requirements on space, with components in reduced sizes. A minimum height of a board-to-board plug of front-line board-to-board manufacturers has reached an ultra-low height of 0.6 mm after fitting with a socket, and a pitch between terminals has reached a distance of 0.25 mm. Such a tiny connector puts forward a high requirement on structural strength of the connector. Moreover, compared with conventional board-to-board connector assemblies, large-scale functional integration of existing smart phones puts forward a higher requirement on current carrying capacity. For example, liquid crystal displays require current transfer capacity to be up to 5 A. The design of the conventional board-to-board connector assemblies is incapable of adapting to current market requirements on strength and current transfer.

SUMMARY

In view of the above, there is a need to provide a board-to-board socket and a board-to-board connector assembly to meet the requirements that the product still has good strength and can transfer large current after being lightweight.

In order to solve the above technical problem, the present application provides a board-to-board socket, including a socket body, a socket terminal and a socket strengthener, wherein the socket body includes a bottom wall, socket side walls formed by protruding upwards from two longitudinal ends of the bottom wall, socket guide parts formed at two lateral ends of the socket body, and an island part formed by protruding upwards from the bottom wall; each of the socket guide parts includes a plug guide part receiving cavity, a longitudinal outer peripheral wall located at the lateral outer side of the plug guide part receiving cavity, and a pair of lateral outer peripheral walls located at two longitudinal sides of the plug guide part receiving cavity; the socket strengthener includes a main body part covering the upper surface of the longitudinal outer peripheral wall, lateral outer peripheral wall covering parts which extend from the main body part and cover the lateral outer peripheral walls, and elastic arm parts extending from the lateral outer peripheral wall covering parts to the sides of the lateral outer peripheral walls close to the plug guide part receiving cavities; and the tops of the elastic arm parts bend and extend towards longitudinal outer sides to form hitching parts hitched on the top faces of the lateral outer peripheral walls.

In order to solve the above technical problem, the present application further provides a board-to-board connector assembly, including a socket and a plug engaged therewith, the plug including a plug body, a plug terminal, and a plug strengthener, the plug body including a top wall, plug side walls formed by extending downwards from two longitudinal ends of the top wall, plug guide parts formed at two lateral ends of the plug body, and an island part receiving cavity located between the plug side walls and the plug guide parts, the socket including a socket body, a socket terminal and a socket strengthener, the socket body including a bottom wall, socket side walls formed by protruding upwards from two longitudinal ends of the bottom wall, socket guide parts formed at two lateral ends of the socket body, an island part formed by protruding upwards from the bottom wall, and a plug side wall receiving cavity formed between the island part and the socket side walls, wherein each of the socket guide parts includes a plug guide part receiving cavity, a longitudinal outer peripheral wall located at the lateral outer side of the plug guide part receiving cavity, and a pair of lateral outer peripheral walls located at two longitudinal sides of the plug guide part receiving cavity, the socket strengthener includes a main body part covering the surface of the longitudinal outer peripheral wall, lateral outer peripheral wall covering parts which extend from the main body part and cover the lateral outer peripheral walls, and elastic arm parts extending from the lateral outer peripheral wall covering parts to the sides of the lateral outer peripheral walls close to the plug guide part receiving cavities, the tops of the elastic arm parts bend and extend towards longitudinal outer sides to form hitching parts hitched on the top faces of the lateral outer peripheral walls, and when the plug is engaged with the socket, the plug strengthener is electrically contacted with the elastic arm parts.

According to the present application, the elastic main arms bend and extend toward longitudinal outer sides to form hitching parts hitched on the support shoulder, and the top ends of the lateral outer peripheral wall covering parts bend toward longitudinal inner sides to form protection parts higher than the hitching parts to prevent damages to the elastic main arms caused by downward hitching of the plug strengthener when the elastic main arms are inserted into the plug.

BRIEF DESCRIPTION OF DRAWINGS

The accompanying drawings illustrated herein are intended to provide further understanding of the present application and form part of the present application, and schematic embodiments of the present application and the descriptions thereof are intended to explain the present application and do not constitute improper limitations on the present application. In the drawings.

FIG. 1 is an assembled view of a board-to-board connector assembly according to Embodiment 1;

FIG. 2 is a sectional view taken along a dotted line A-A in FIG. 1;

FIG. 3 is a three-dimensional assembled view of a board-to-board plug according to Embodiment 1;

FIG. 4 is a three-dimensional view and a partial enlarged view of a plug body of the board-to-board plug according to Embodiment 1;

FIG. 5 is a three-dimensional view of a plug strengthener of the board-to-board plug according to Embodiment 1;

FIG. 6 is a three-dimensional view of the plug strengthener of the board-to-board plug according to Embodiment 1 from another perspective;

FIG. 7 is a three-dimensional assembled view of a board-to-board socket according to Embodiment 1;

FIG. 8 is a three-dimensional view and a partial enlarged view of a socket body of the board-to-board socket according to Embodiment 1;

FIG. 9 is a three-dimensional view of a socket strengthener of the board-to-board socket according to Embodiment 1;

FIG. 10 is a three-dimensional view of the socket strengthener of the board-to-board socket according to Embodiment 1 from another perspective;

FIG. 11 is a top view of the socket strengthener of the board-to-board socket according to Embodiment 1;

FIG. 12 is a left or right view of the socket strengthener of the board-to-board socket according to Embodiment 1;

FIG. 13 is a side view of the socket strengthener of the board-to-board socket according to Embodiment 1;

FIG. 14 is a sectional view taken along a dotted line B-B in FIG. 1; and FIG. 15 is a partial sectional view taken along a dotted line C-C in FIG. 1.

FIG. 16 is a partial three-dimensional view of a board-to-board socket according to Embodiment 2;

FIG. 17 is a three-dimensional view of a socket strengthener of the board-to-board socket according to Embodiment 2; and FIG. 18 is a side view of the socket strengthener of the board-to-board socket according to Embodiment 2.

FIG. 19 is a three-dimensional view and a partial enlarged view of a board-to-board socket according to Embodiment 3;

FIG. 20 is a partial enlarged view of a socket body of the board-to-board socket according to Embodiment 3;

FIG. 21 is a three-dimensional view of a socket strengthener of the board-to-board socket according to Embodiment 3;

FIG. 22 is a three-dimensional view of the socket strengthener of the board-to-board socket according to Embodiment 3 from another perspective;

FIG. 23 is a side view of the socket strengthener of the board-to-board socket according to Embodiment 3;

FIG. 24 is a front or back view of the socket strengthener of the board-to-board socket according to Embodiment 3; and FIG. 25 is a top view of the socket strengthener of the board-to-board socket according to Embodiment 3.

DESCRIPTION OF EMBODIMENTS

In order to make the objectives, technical solutions and advantages of the present application clearer, the technical solutions of the present application will be clearly and completely described in conjunction with specific embodiments of the present application and the corresponding accompanying drawings. It is apparent that the embodiments described are merely some rather than all of the embodiments of the present application. All other embodiments obtained by those of ordinary skill in the art based on the embodiments in the present application without creative efforts fall within the protection scope of the present application.

Figure 1:
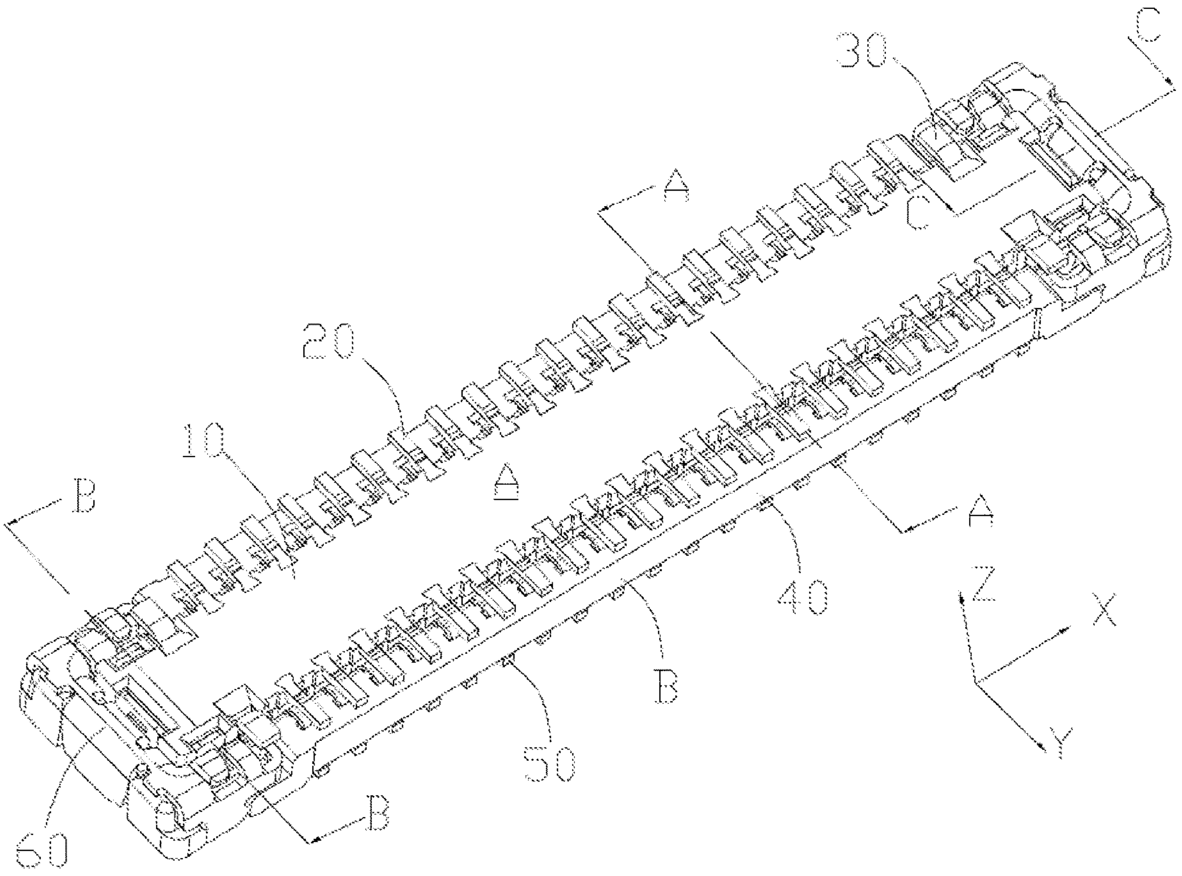
FIG. 1 to FIG. 15 are drawings of the specification of Embodiment 1 of a board-to-board connector assembly according to the present application.

Directions defined in the present application are subjected to FIG. 1. Direction X is “right” in a left-right direction (lateral direction), Direction Y is “front” in a front-rear direction (longitudinal direction), and Direction Z is “up” in an up-down direction (vertical direction).

Embodiment 1

Referring to FIG. 1, a board-to-board connector assembly according to the present application includes a plug A attached to a printed circuit board and a socket B attached to another printed circuit board. The plug A is interlocked with and connected to the socket B.

The plug A includes a plug body 10, several plug terminals 20 formed in the plug body 10, and a plug strengthener 30 fixed to two lateral ends of the plug body 10. The socket B includes a socket body 40, a socket terminal 50 mounted on the socket body 40, and a socket strengthener 60 mounted on and fixed to two lateral ends of the socket body 40.

Referring to FIG. 2 to FIG. 6, the plug body 10 of the plug A includes a top wall 11, a pair of plug side walls 12 formed by extending downwards from two longitudinal sides of the top wall 11, plug guide parts 14 formed at two lateral ends of the plug body 10, and an island part receiving cavity 13 formed among the top wall 11, the pair of plug side walls 12, and the plug guide parts 14.

The plug terminals 20 are integrally formed on the pair of plug side walls 12 in two rows in the lateral direction. The plug guide parts 14 each include a bottom surface 141, a longitudinal outer side face 142, a pair of lateral outer side faces 143, and a slope 144 toward the island part receiving cavity 13. The longitudinal outer side face 142 is provided with a first notch 1421. The lateral outer side faces 143 each include two bumps 1431 and 1432 protruding longitudinally, a second notch 1433 located between the two bumps 1431 and 1432, and a third notch 1434 located between the bump 1432 and the plug side wall 12. An inclined plane 1441 upward from the bottom surface 141 to the top wall 11 and an engaging hole 1442 recessed upwards from the inclined plane 1441 at the side close to the bottom surface 141 are formed on the slope 144.

The plug strengthener 30 includes a covering base part 31 longitudinally covering the bottom surface 141 of the plug guide part 14, a longitudinal outer side face covering part 35 and a longitudinal inner side face covering part 34 formed by bending and extending upwards from two lateral ends of the covering base part 31, covering the longitudinal outer side face 142 and clamped into the engaging hole 1442, and a lateral outer side face covering part 33 formed by bending and extending upwards from two longitudinal ends of the covering base part 31 and covering the lateral outer side face 143 along the lateral direction. The longitudinal outer side face covering part 35 is clamped into the first notch 1421.

The lateral outer side face covering part 33 includes a contact part 331 clamped into the second notch 1433, and a solder pin 332 formed by bending from the top of one end of the lateral outer side face covering part 33 away from the longitudinal outer side face covering part 35 to a longitudinal outer side. The contact part 331 of the lateral outer side face covering part 33 is clamped into the second notch 1433. The solder pin 332 is clamped into the third notch 1434 and then bends vertically toward the longitudinal outer side. The lateral outer side face covering part 33 is further provided with a bayonet 333 to be clamped into a periphery of the bump 1432 to enhance retaining force between the plug strengthener 30 and the plug guide part 14.

Figure 2:
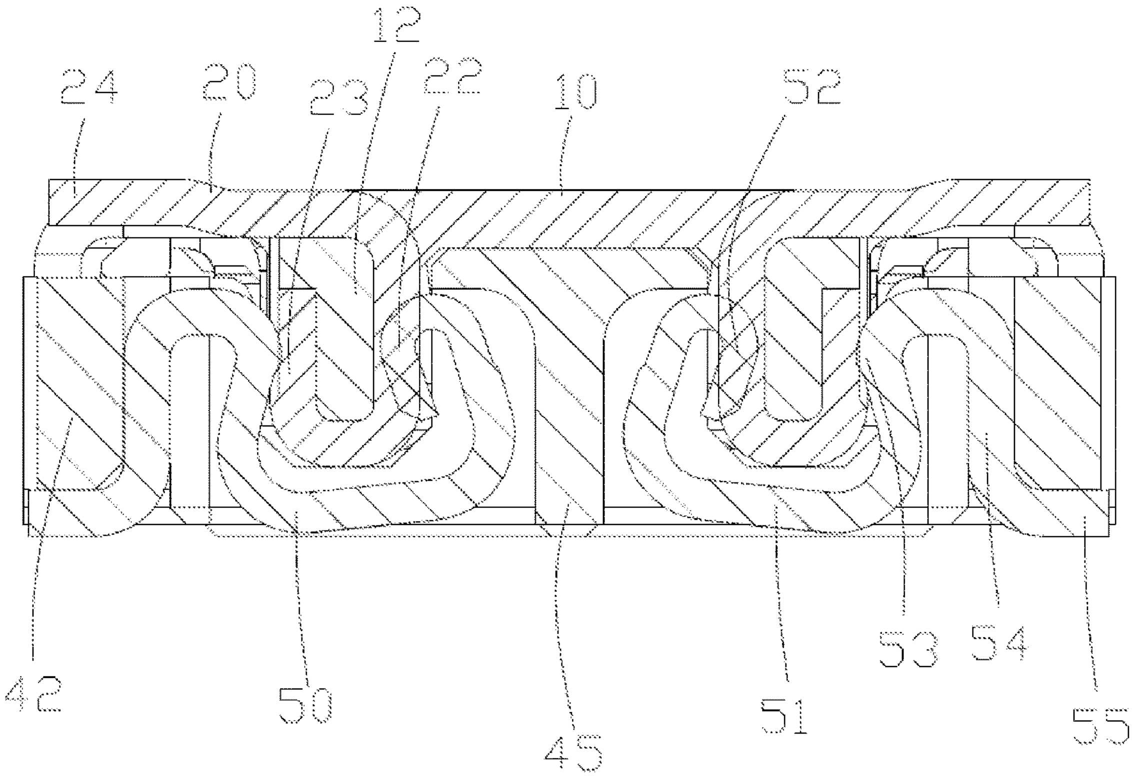
Figure 3:
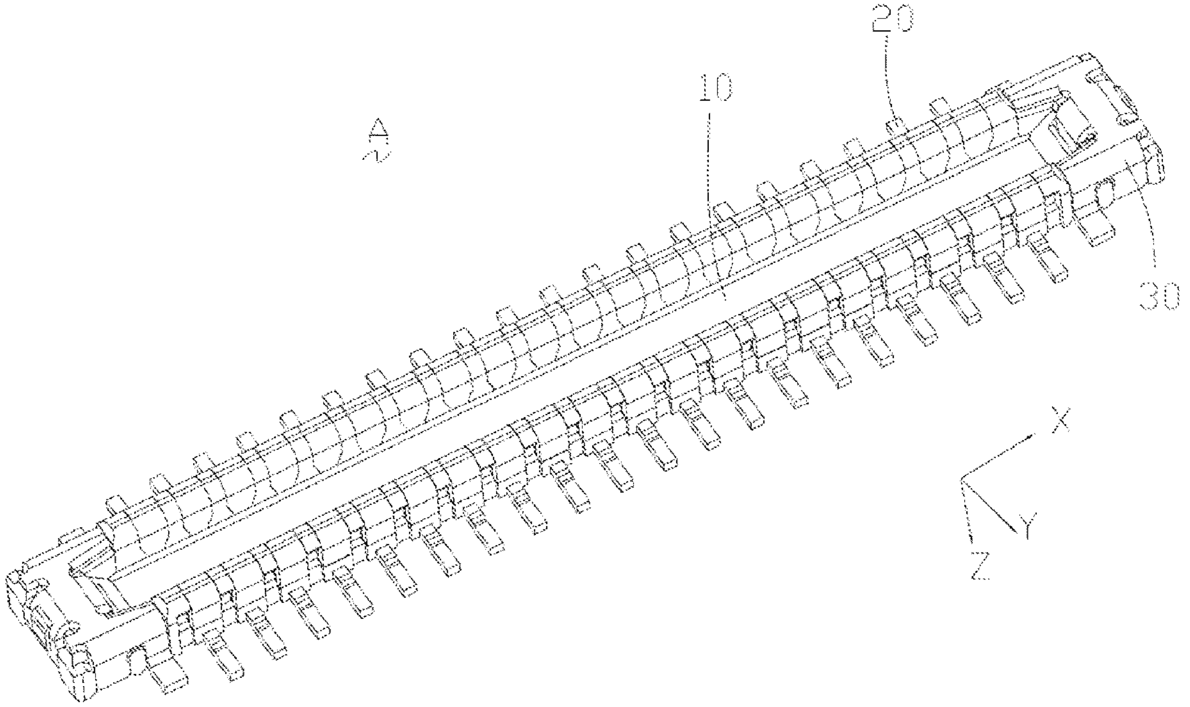
Figure 4:
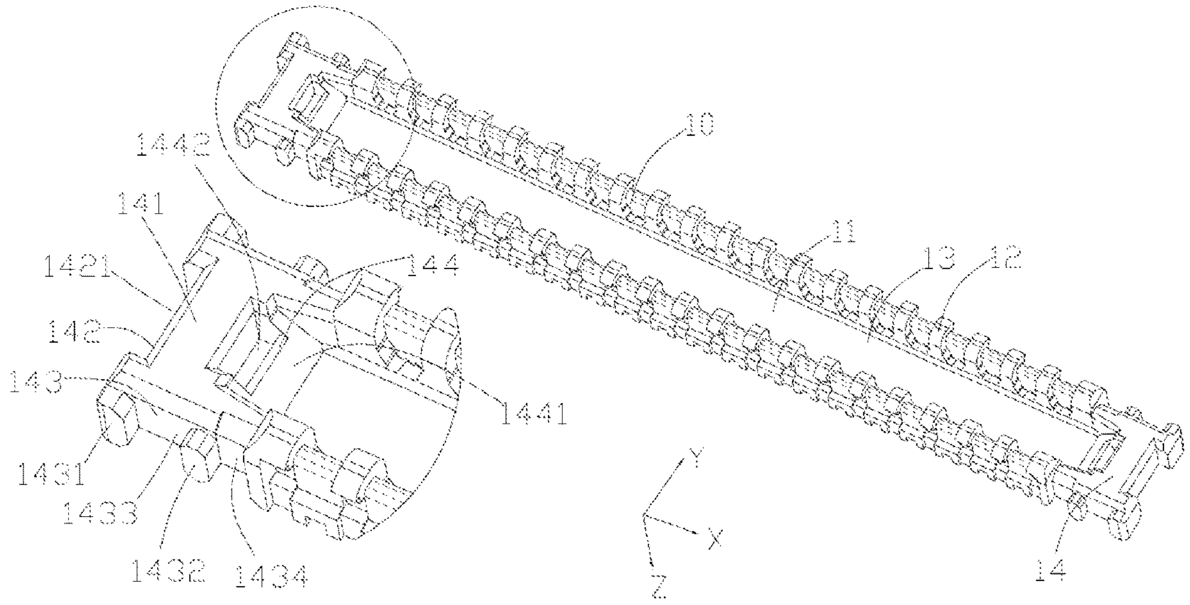
Figure 5:
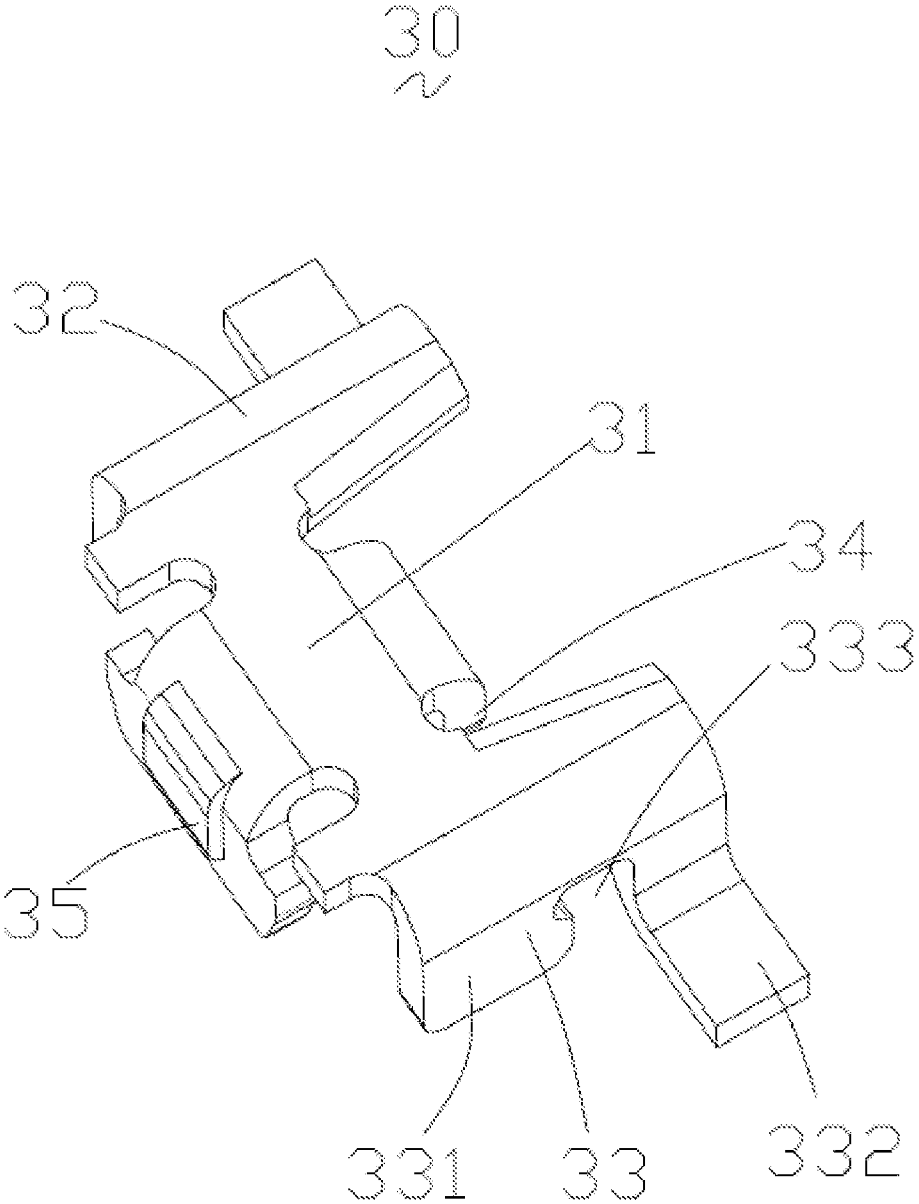
Figure 6:
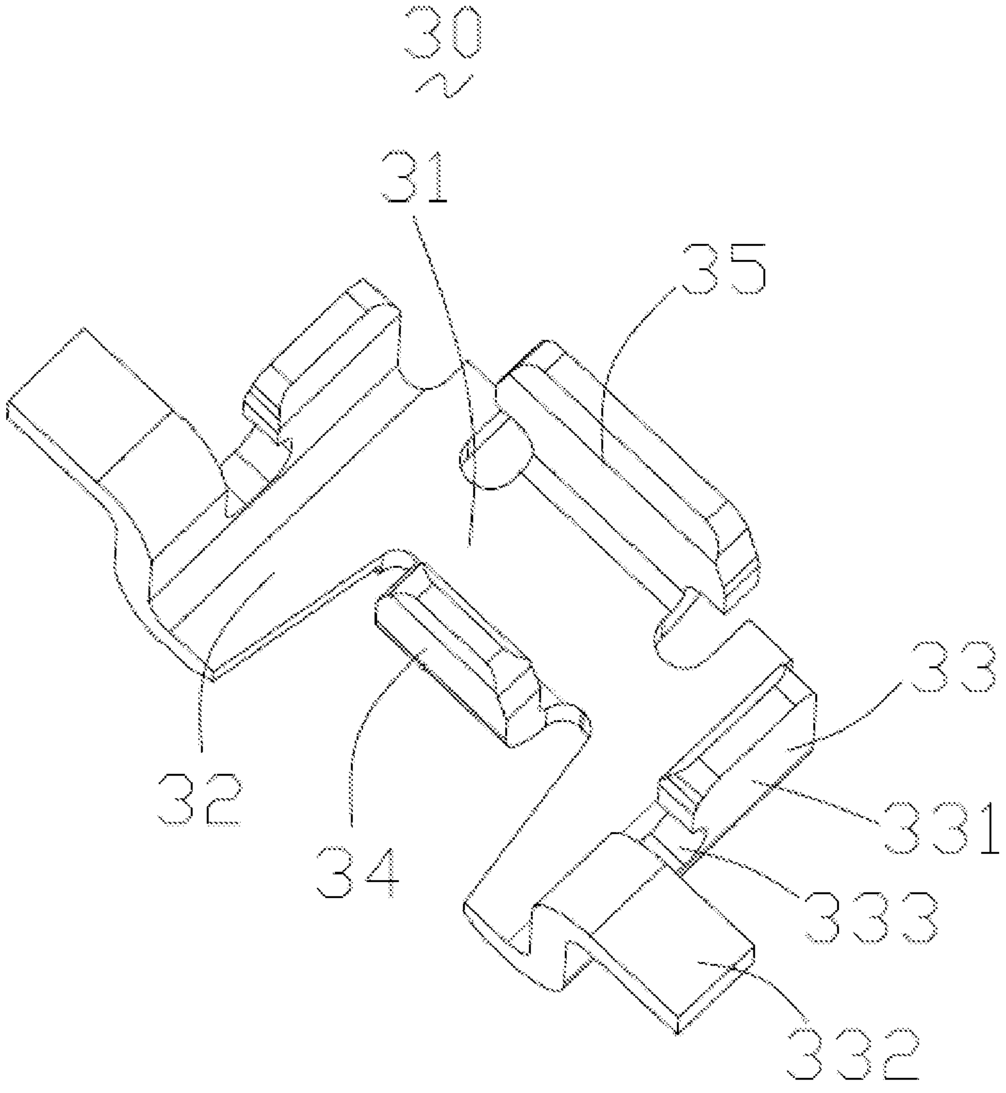
Figure 7:
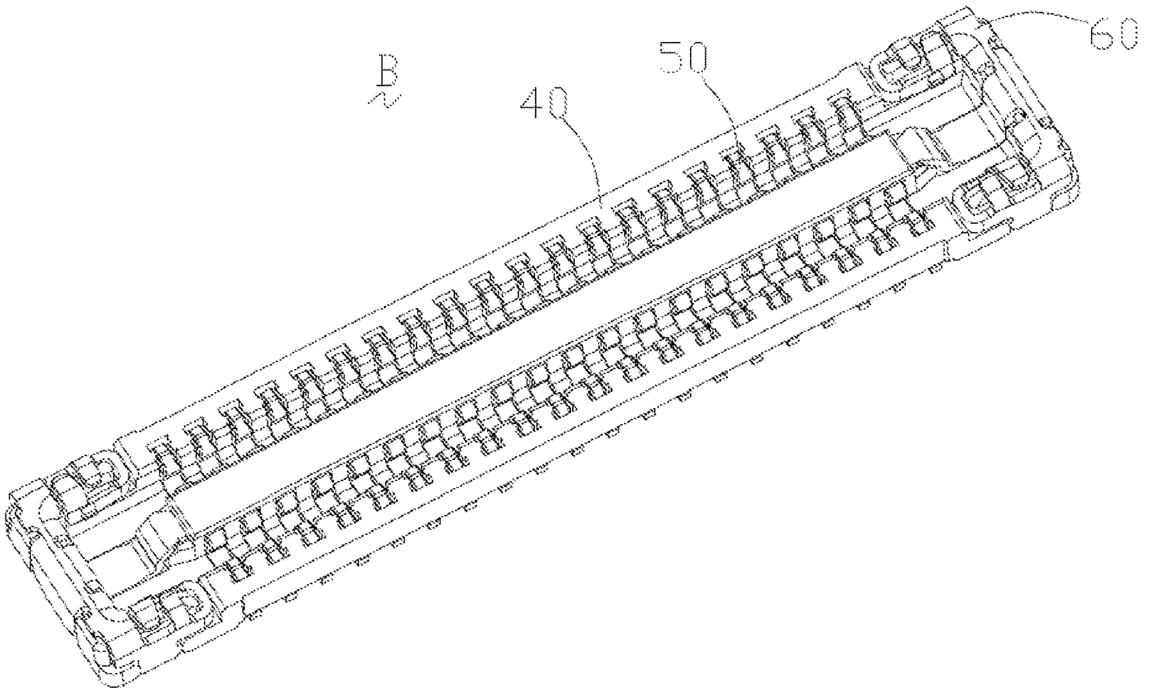

Particularly referring to FIG. 2, the plug terminal 20 includes a plug terminal solder pin 24 extending longitudinally from an upper surface of the top wall 11 outside the top wall 11, a plug terminal first contact part 22 bending from the plug terminal solder pin 24 along a surface of the top wall 11 to an inner side face of the plug side wall 12, and a plug terminal second contact part 23 bending and extending reversely from a lower end of the plug terminal first contact part 22 to an outer side face of the plug side wall 12. The plug terminal second contact part 23 is provided with a recess structure.

Still referring to FIG. 1, FIG. 2, FIG. 7 and FIG. 8, the socket body 40 of the socket B of the board-to-board connector assembly according to the present application includes a bottom wall 41, a pair of socket side walls 42 formed by extending upwards from two longitudinal sides of the bottom wall 41, an island part 45 formed by protruding upward from the bottom wall 41 and located between the pair of socket side walls 42, socket guide parts 44 formed at two lateral ends of the socket body 40, and a plug side wall receiving cavity 43 formed between the island part 45 and the pair of socket side walls 42.

The bottom wall of the socket body 40 is provided with several terminal slots 46 from bottom to top. The socket terminal 50 is assembled upward in the terminal slots 46. The socket terminal 50 includes a support arm part 51 extending into the terminal slot 46 at the bottom wall 41 and exposed to the bottom of the terminal slot 46, a socket terminal second contact part 52 formed by bending and extending upwards from a longitudinal outer side of the support arm part 51 and located on a longitudinal side face of the island part 45 and toward the socket side wall 42, a socket terminal first contact part 53 formed by bending upwards from a longitudinal inner side of the support arm part 51 and located on a longitudinal side face of the socket side wall 42, a retaining part 54 formed by bending and extending reversely from a top end of the first contact part 53, and a solder pin 55 bending vertically from a lower end of the retaining part 54 and extending longitudinally outwards to a lower surface of the bottom wall 41 of the socket body 40.

When the plug A fits with the socket B, the island part 45 is received in the island part receiving cavity 13 of the plug A, the plug side wall 12 of the plug A is received in the plug side wall receiving cavity 43 of the socket B, and the plug guide part 14 is guided into the socket guide part 44. The plug terminal 20 is clamped between the socket terminal first and second contact parts 53 and 52 of the socket terminal 50. The first and second contact parts 22 and 23 of the plug terminal 20 are electrically contacted with the first and second contact parts 53 and 52 of the socket terminal 50 respectively.

Figure 8:
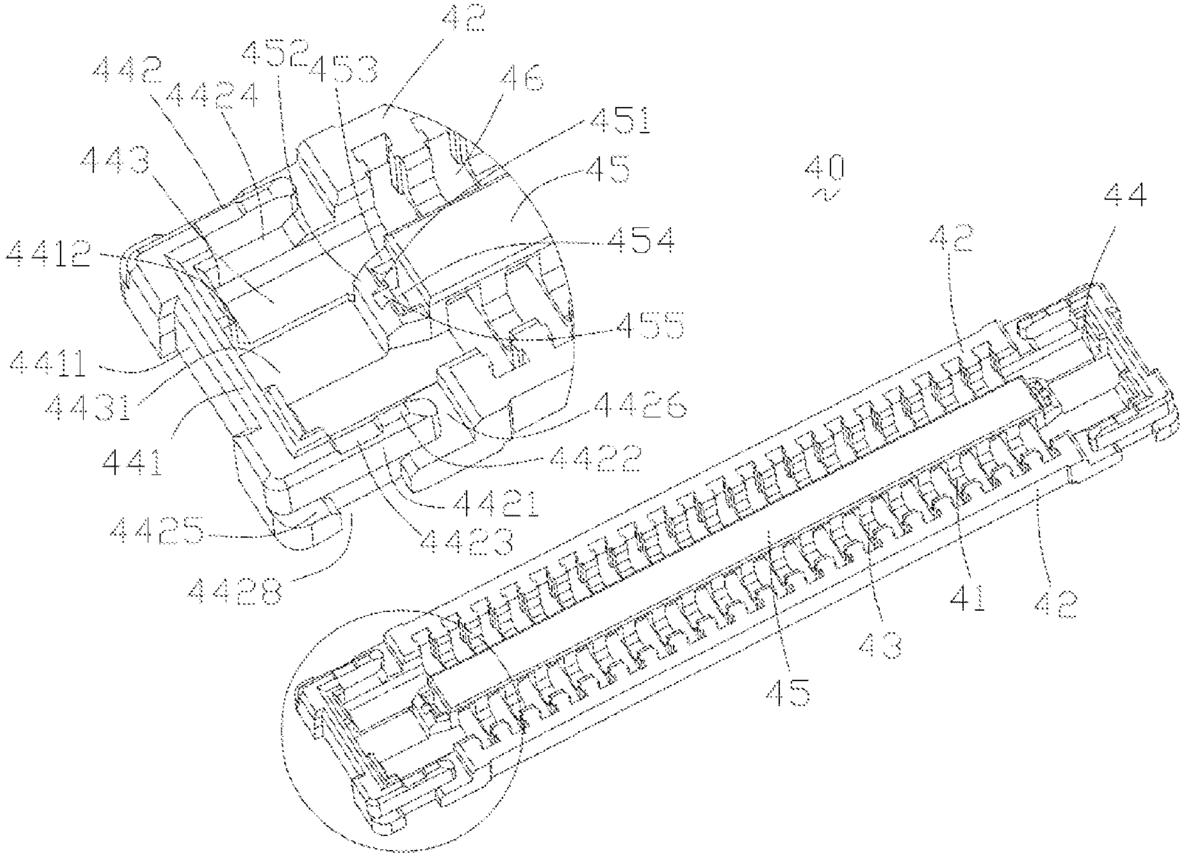
Figure 9:
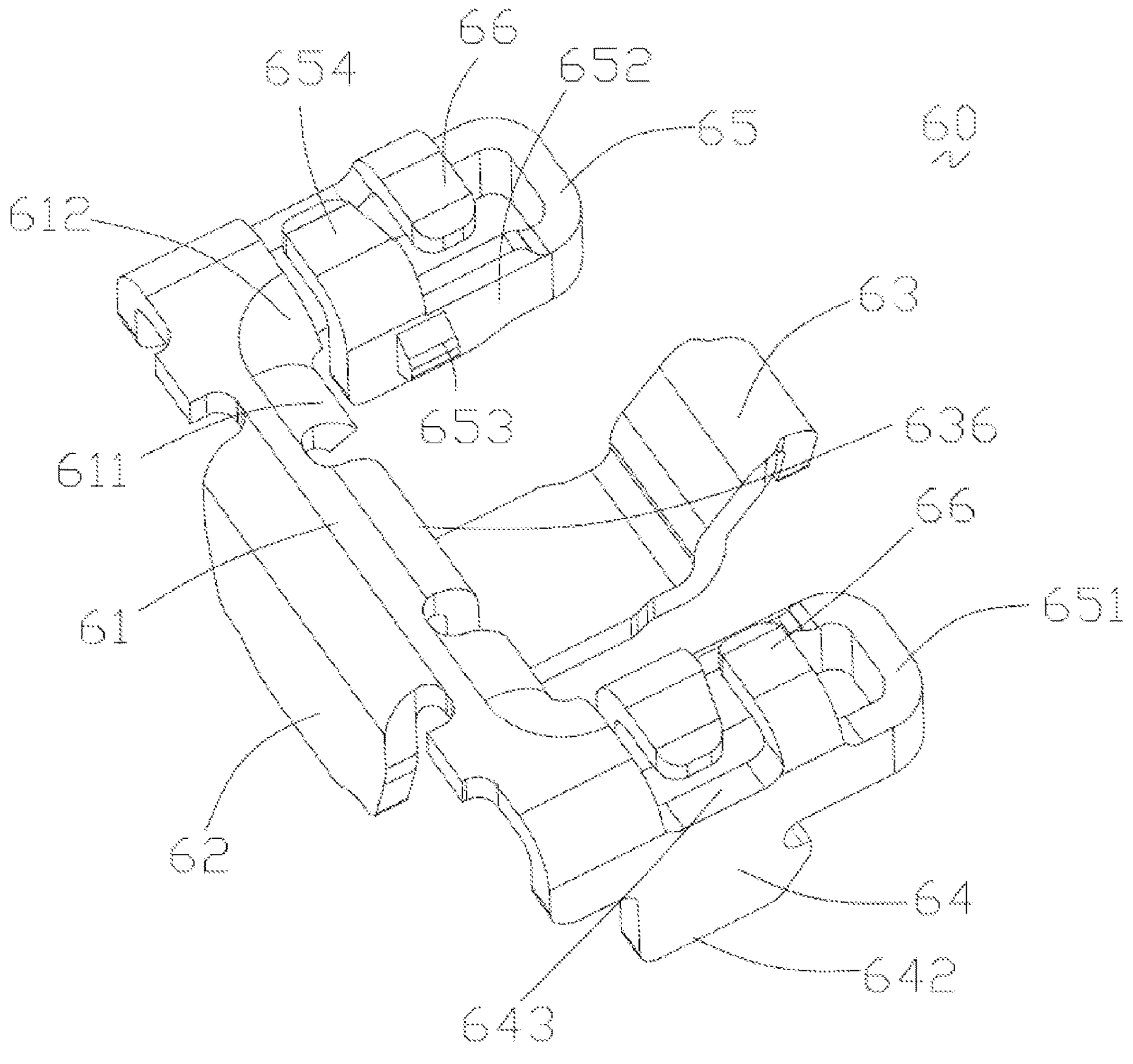
Figure 10:
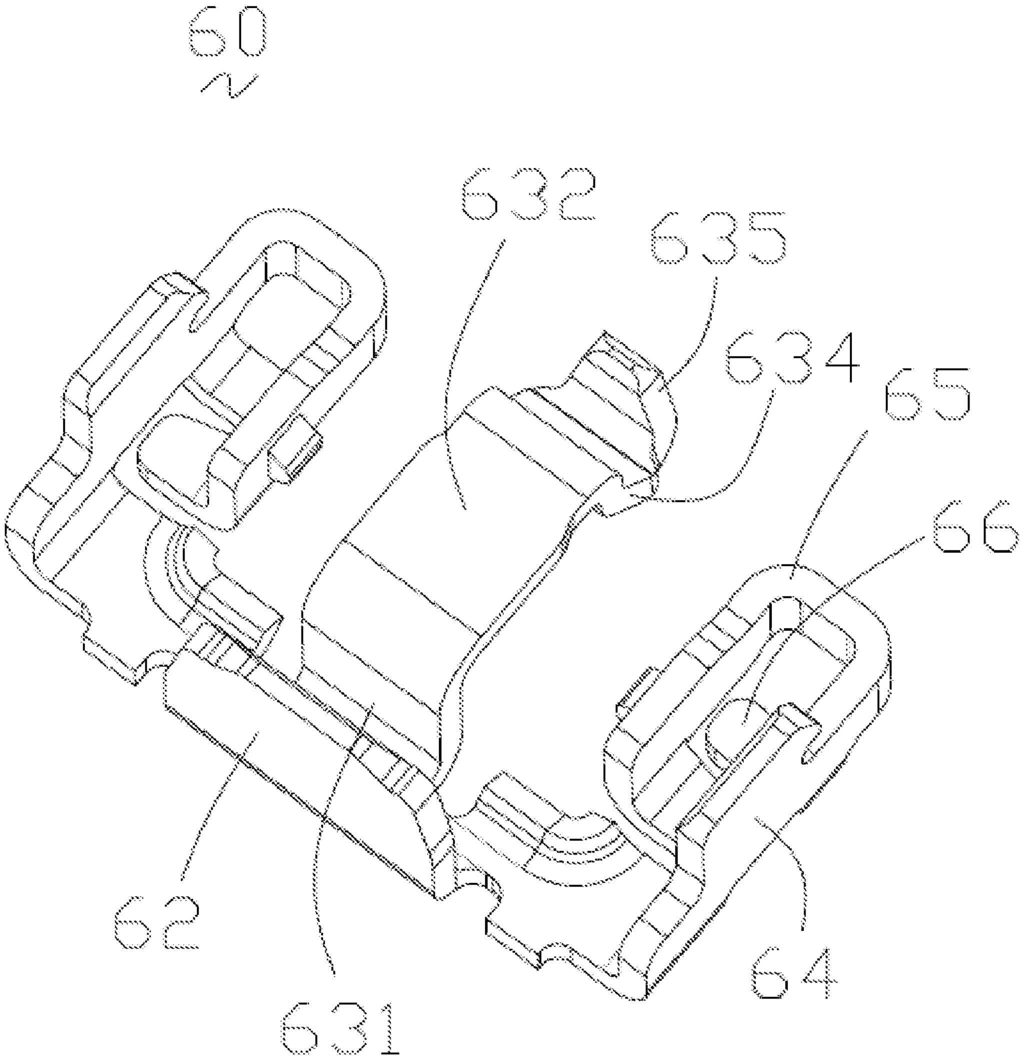
Figure 11:
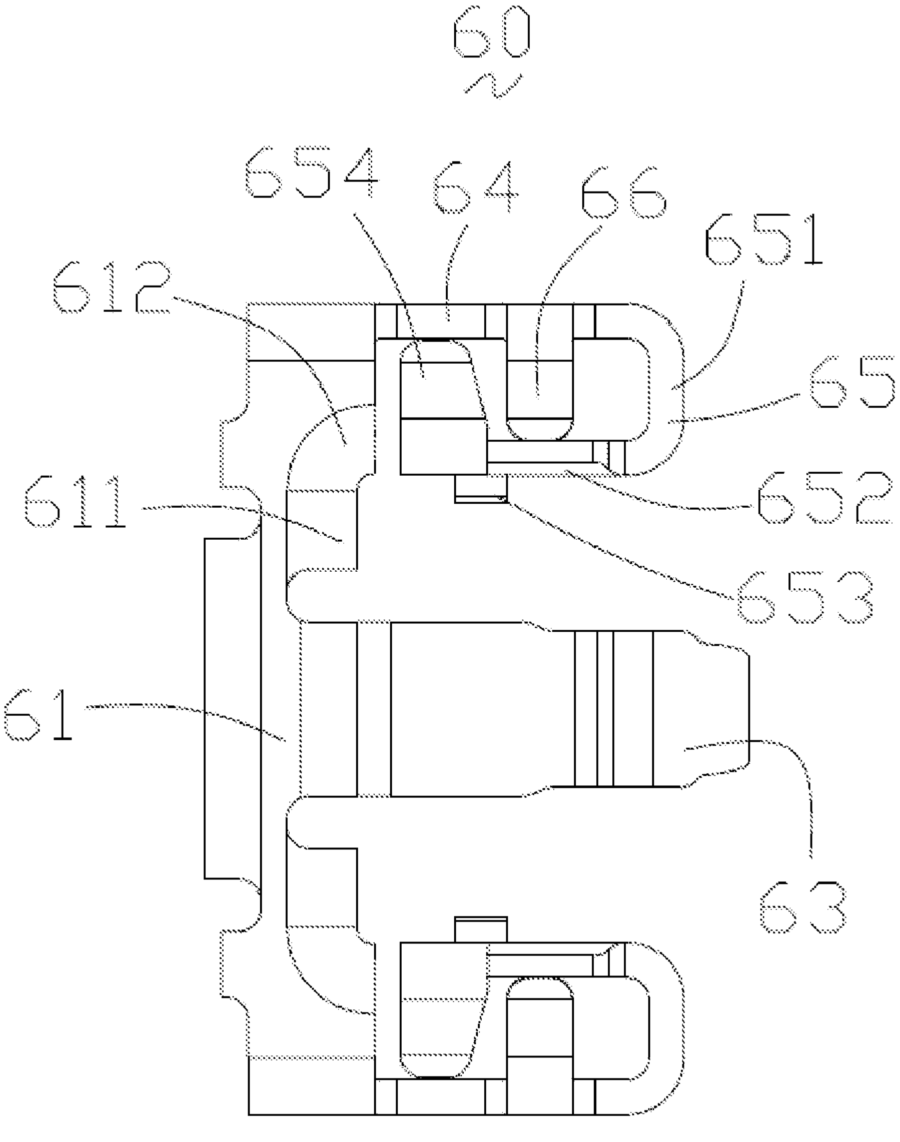

Particularly referring to FIG. 8, two lateral ends of the island part 45 are provided with protected parts 451 toward the socket guide parts 44. The protected part 451 includes a mesa part 453 whose horizontal plane is lower than the island part 45, a relief slope 452 formed by tilting obliquely downwards from the mesa part 453, an engaging slot 454 recessed downwards from the mesa part 453, and a communication notch 455 communicated with the relief slope 452 and arranged from the engaging slot 454 toward a lateral outer side.

The socket guide part 44 includes peripheral walls 441 and 442 and a plug guide part receiving cavity 443 located between the peripheral walls 441 and 442. The peripheral wall includes a longitudinal outer peripheral wall 441 and a pair of lateral outer peripheral walls 442 connected to two ends of the longitudinal outer peripheral wall 441. The lateral outer peripheral walls 442 are connected to the socket side walls 42.

A through opening 4431 running through in an up-down direction corresponding to horizontal extension of the island part 45 is formed on the plug guide part receiving cavity 443. The through opening 4431 extends to a lower end of the longitudinal outer peripheral wall 441. First and second extending slots 4411 and 4412 are arranged at horizontal outer and inner sides of the longitudinal outer peripheral wall 441 respectively. The second extending slot 4412 is communicated with the through opening 4431. The longitudinal outer peripheral wall 442 protrudes upward in the middle to form a support shoulder 4421. The periphery of the support shoulder 4421 is provided with a mounting step part 4425 located at a longitudinal outer side of the support shoulder 4421 and extending in the lateral direction, a communicating step part 4426 separating the support shoulder 4421 from the socket side wall 42, and an elastic relief part 4424 located at a longitudinal inner side of the support shoulder 4421 and extending in the lateral direction. The mounting step part 4425, the communicating step part 4426, and the elastic relief part 4424 are mutually communicated to form a U-shaped step part. A top face of the support shoulder 4421 is provided with a lower groove 4423 and an upper platform 4422. The lower groove 4423 is close to one side of the longitudinal outer peripheral wall 441, the upper platform 4422 is close to the communicating step part 4426, and a horizontal position of a top face of the upper platform 4442 is higher than a horizontal position of a surface of the lower groove 4423. The mounting step part 4425 partially runs vertically through to form a third extending slot 4428.

Still referring to FIG. 9 to FIG. 13, the socket strengthener 60 includes a main body part 61 longitudinally covering a top face of the longitudinal outer peripheral wall 441, a longitudinal outer peripheral wall covering part 62 bending and extending downwards from a horizontal outer end of the main body part 61 into the first extending slot 4411, a central guide part 63 bending downwards from a lateral inner side of the main body part 61 and extending to the protected part 451 on a horizontal end part of the island part 45, a lateral outer peripheral wall covering part 64 located at a longitudinal outer side of the lateral outer peripheral wall 442 and formed by bending downwards from longitudinal outer ends of the main body part 61 and extending along the mounting step part 4425, and an elastic arm part 65 bending reversely from the free end of the lateral outer peripheral wall covering part 64 and extending to the elastic relief part 4424 through the communicating step part 4426. The elastic arm part 65 may bend and extend from either of the two lateral ends of the lateral outer peripheral wall covering part 64 to the elastic relief part 4424. At the same time, in another embodiment, the elastic arm part 65 may also bend reversely downwards from two longitudinal ends at the lateral outer side of the main body part 61 and then extend to the elastic relief part 4424.

A free end 642 of the longitudinal outer peripheral wall covering part 62, as a solder pin, is fixed to the printed circuit board. A bottom end of the lateral outer peripheral wall covering part 64, as a solder pin, extends through the third extending slot 4428 to the printed circuit board for soldering and fixing. One side of the main body part 61 toward the plug guide part receiving cavity 443 bends downwards at two longitudinal sides of the central guide part 63 to form first and second cambered surface guide parts 611 and 612. Guide cambered surfaces 636 formed by downward bending of the first arc guide part 611 and the central guide part 63 from the main body part 61 keep consistent.

The central guide part 63 includes a first central guide arm 631 bending downwards from the lateral inner side of the main body part 61 and extending into the second extending slot 4412, a support bottom arm 632 bending horizontally from the bottom of the first central guide arm 631 and extending along the through opening 4431 to the bottoms of the protected parts 451 at the two sides of the island part 45, a second central guide arm 634 extending obliquely upwards from the support bottom arm 632 above the protected part 451, and a snap-in end part 635 bending downwards from a free end of the second central guide arm 634 and snapped into the engaging slot 454. The first and second central guide arms 631 and 634 are used to guide the insertion of the plug strengthener 30 and protect the longitudinal outer peripheral wall 441 of the socket body 40 and the protected parts 451 at the two lateral ends of the island part 45. The longitudinal side face covering part 35 and the longitudinal inner side face covering part 34 of the plug strengthener 30 are respectively guided by the first and second central guide arms 631 and 634 and enter between the first and second central guide arms 631 and 634 above the support bottom arm 632. However, in an insertion state, the longitudinal outer side face covering part 35 and the longitudinal inner side face covering part 34 are not in electrical contact with the first and second central guide arms 631 and 634. During the insertion, the support bottom arm 632 is compressed to generate supporting force with the printed circuit board attached thereto so that the first and second central guide arms 631 and 634 have certain elasticity.

Tops of the peripheral wall covering parts 64 bend and extend toward the elastic arm parts 65 to form protection parts 66 supported above the upper platform 4422 of the support shoulder 4421. When the plug A is not inserted into the socket B, that is, the socket B is in a natural state, observed from top to bottom (i.e., shown in FIG. 11), the protection parts 66 do not cover the elastic arm parts 65. When the elastic arm parts 65 are compressed toward the longitudinal outer sides by the contact parts 331 of the lateral outer side face covering part 33 of the plug strengthener 30, the elastic arm parts 65 are at least partially located below the protection parts 66.

In the natural state, the elastic arm parts 65 are located above the elastic relief part 4424, and a deformation gap exists between the elastic arm parts and the inner side face of the support shoulder 4421. When the elastic arm parts 65 are longitudinally compressed, the elastic arm parts 65 deform in the deformation gap. The elastic arm parts 65 include tightening parts 651 formed by bending reversely from the free end of the lateral outer peripheral wall covering parts 64 in the lateral direction, elastic main arms 652 extending from the tightening parts 651 to the elastic relief part 4424 in the lateral direction, contact convex parts 653 protruding from the elastic main arms 652 toward the plug guide part receiving cavities 443, and hitching parts 654 formed by bending and extending from top ends of the elastic main arms 652 toward the lateral outer peripheral wall covering parts 64. The hitching parts 654 are supported above the lower groove 4425 of the support shoulder 4421. A cambered surface line of the bending part of the hitching parts 654 is consistent with the second cambered surface guide part 612 on the main body part 61.

Figure 12:
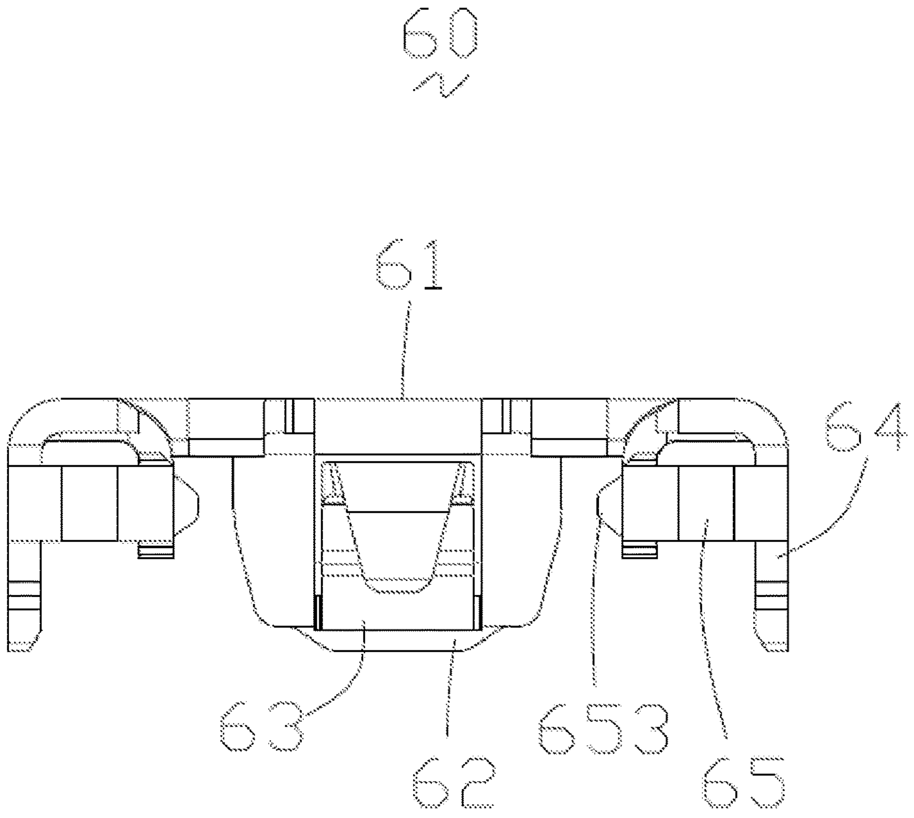
Figure 13:
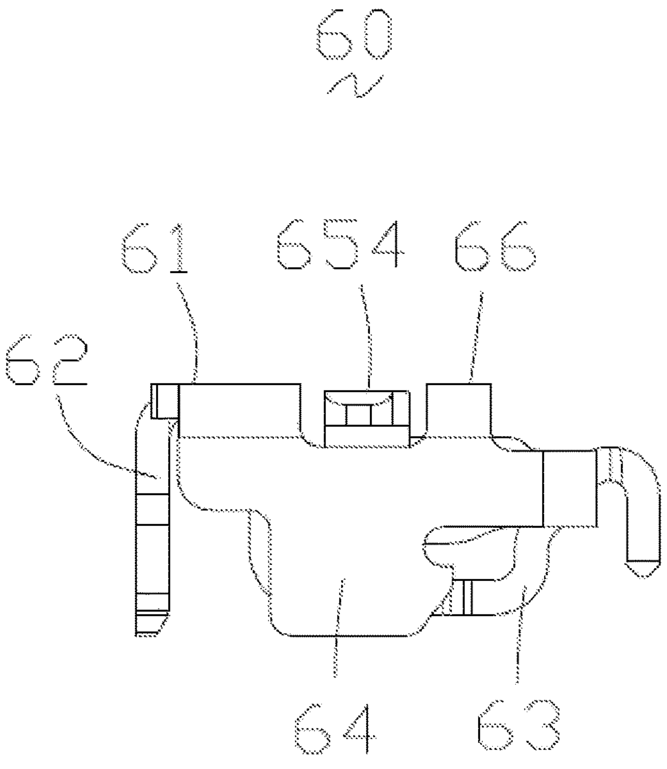
Figure 14:
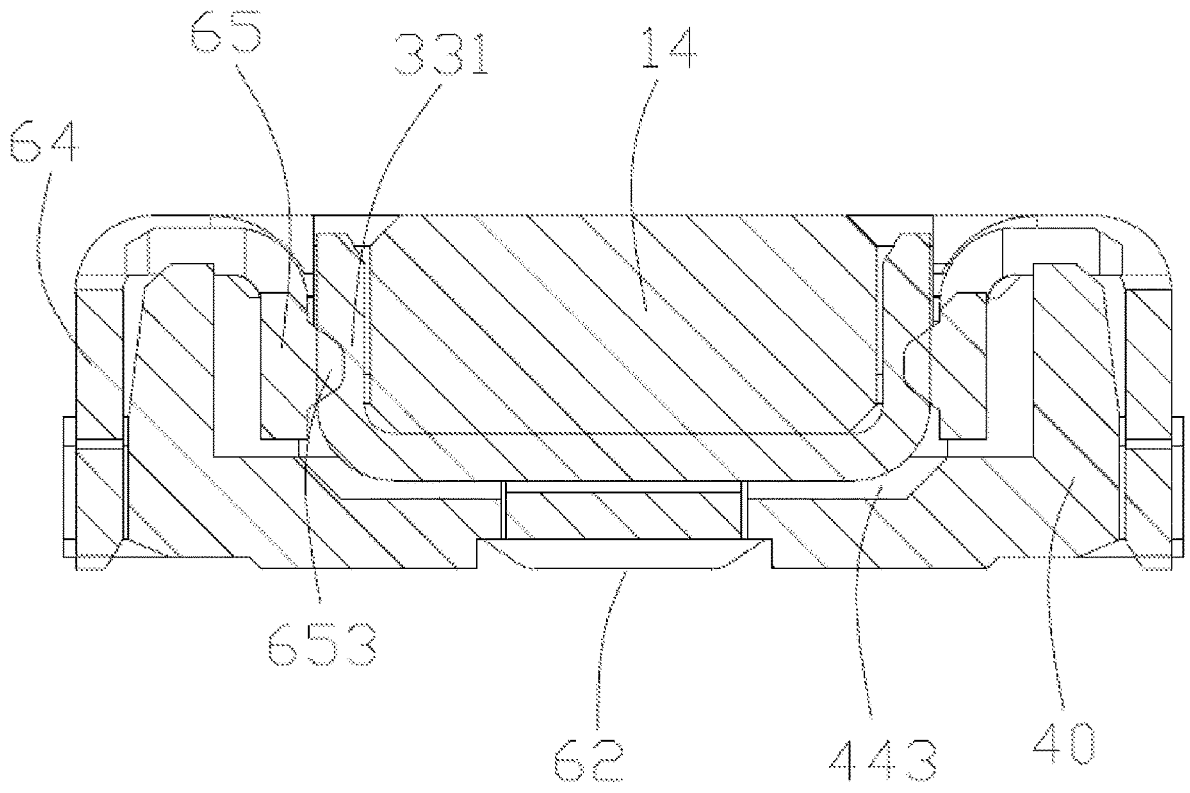
Figure 15:
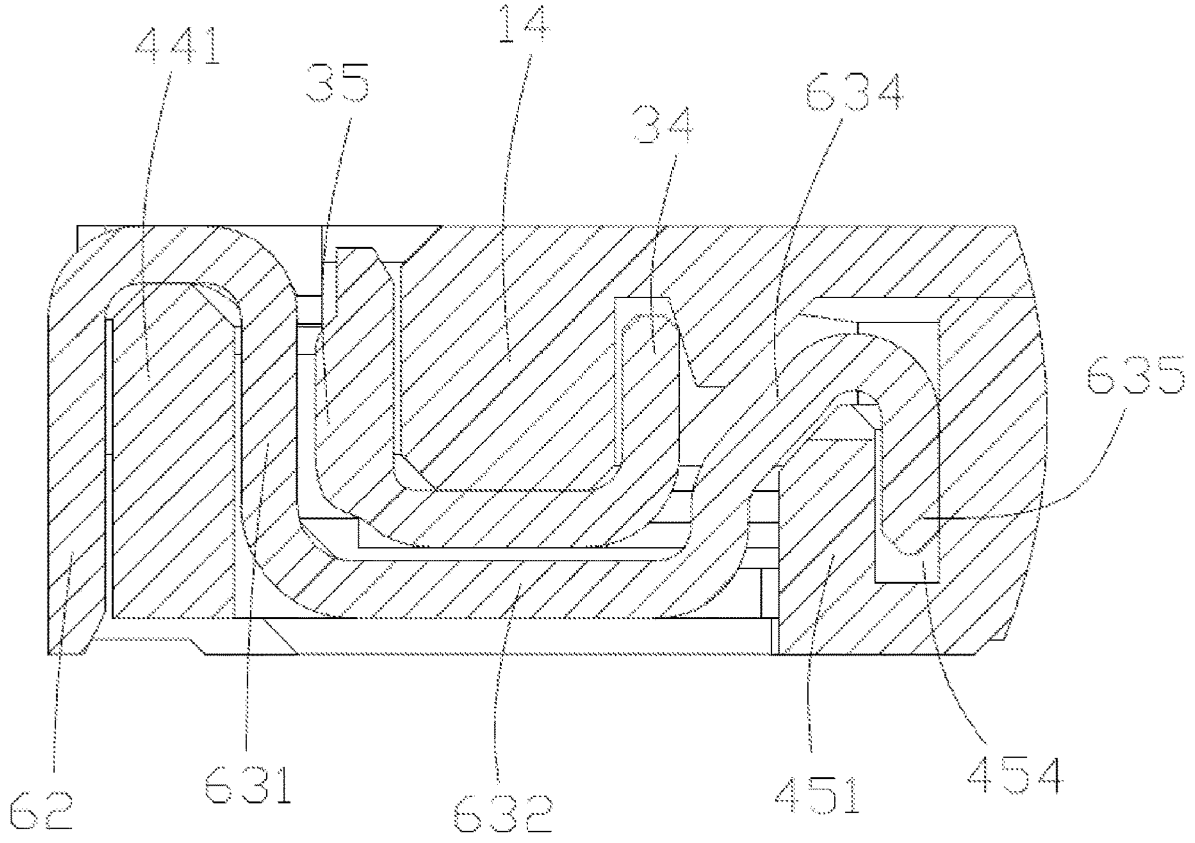

Particularly referring to FIG. 14, horizontal positions of the top faces of the protection parts 66 are higher than those of the hitching parts 654 (particularly refer to FIG. 13), and the top faces of the hitching parts 654 and the top face of the main body part 61 are at a same horizontal position. Observed from a side face (as shown in FIG. 12), the contact convex parts 653 are entirely located in the plug guide part receiving cavities 443. When the plug A is inserted, the lateral outer side face covering part 33 of the plug strengthener 30 first contacts the protection part 66 and is guided to a correct position by the protection part 66 toward one side of the plug guide part receiving cavity 443, and continues to press, an inner edge of the plug strengthener 30 along the hitching parts 654 extrudes the elastic main arms 652 toward the longitudinal outer sides, and the hitching parts 654 prevents damages to the elastic main arms 652 due to downward hitching and bending. After the plug A is finally inserted, the elastic main arms 652 are compressed and deform toward the support shoulder 4421 and provide elastic force, and the contact convex parts 653 are finally electrically contacted with the contact parts 331 of the plug strengthener 30 to transfer the current. The plug strengthener 30 and the socket strengthener 60 are electrically contacted with the two contact convex parts 653 through the two contact parts 331 in the longitudinal direction to transfer the current. A load to transfer the current may be up to 5 amperes.

Elastic deformation of the elastic main arms 652 is appropriate if longitudinal movement of the hitching parts 654 does not the longitudinal outer side faces of the lateral outer peripheral wall covering parts 64. The lateral outer peripheral wall covering parts 64 are provided with avoiding notches 643 corresponding to the hitching parts 654 in the longitudinal direction. When the plug A is inserted, the hitching parts 654 extend above the avoiding notches 643 on the lateral outer peripheral wall covering parts 64 without contact.

In this embodiment, the elastic main arms 652 bend and extend toward longitudinal outer sides to form hitching parts 654 on the support shoulder 4421, and the top ends of the lateral outer peripheral wall covering parts 64 bend toward longitudinal inner sides to form protection parts 66 higher than the hitching parts 654 to prevent damages to the elastic main arms 652 caused by downward hitching of the plug strengthener 30 when the elastic main arms 652 are inserted into the plug.

Embodiment 2

Figure 16:
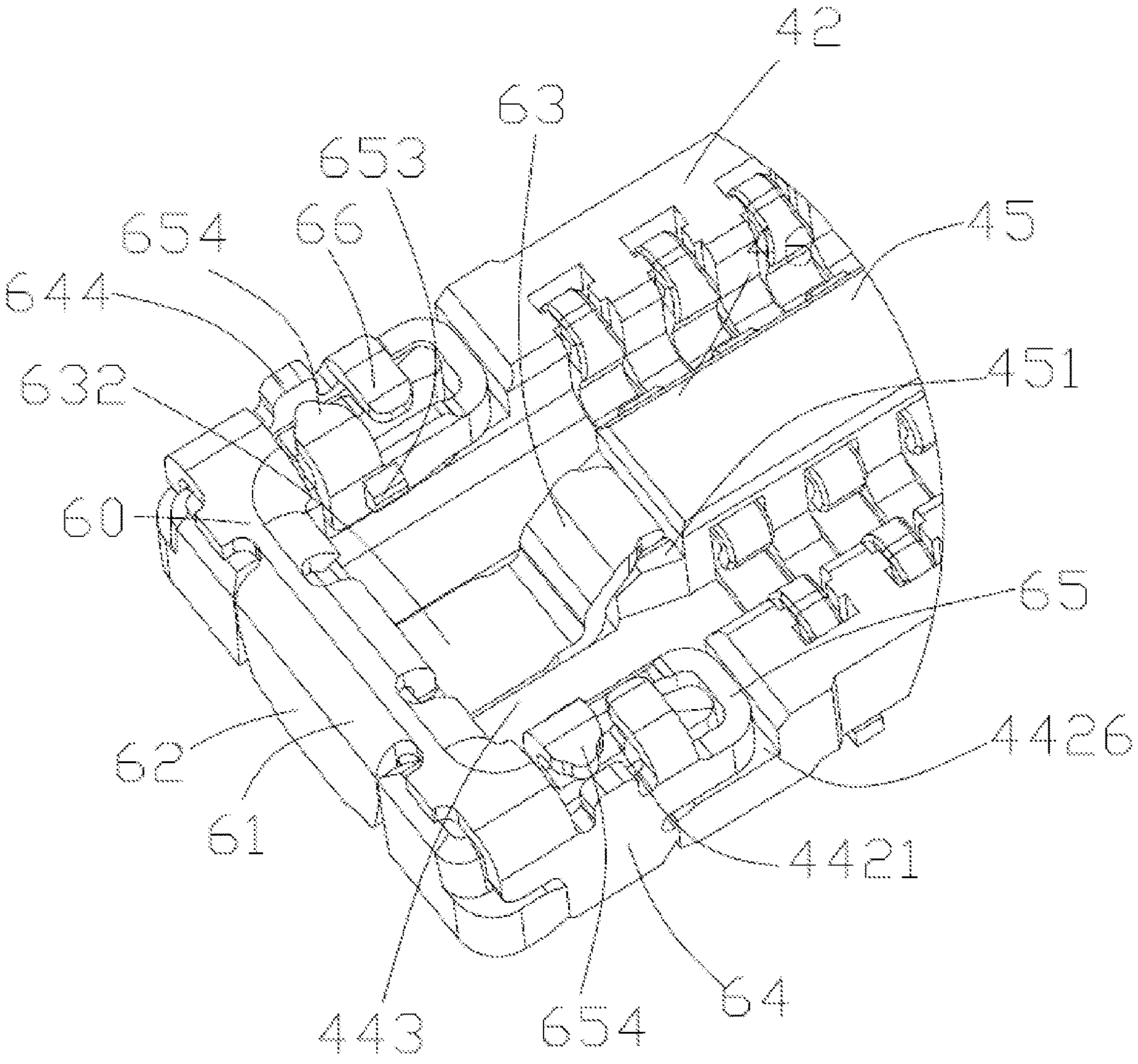
FIG. 16 to FIG. 18 are drawings of the specification of Embodiment 2 of the board-to-board connector assembly according to the present application.
Figure 17:
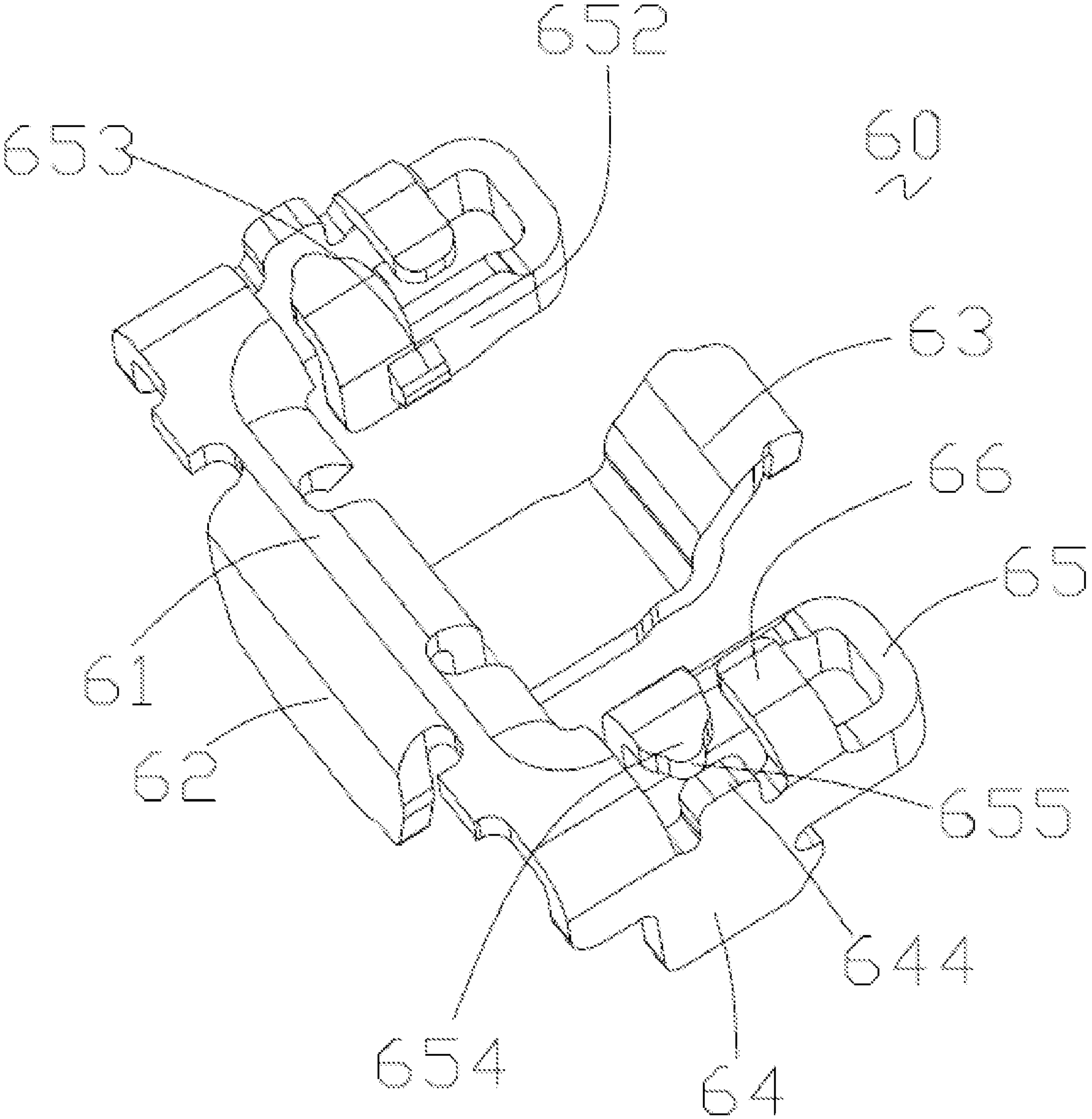
Figure 18:
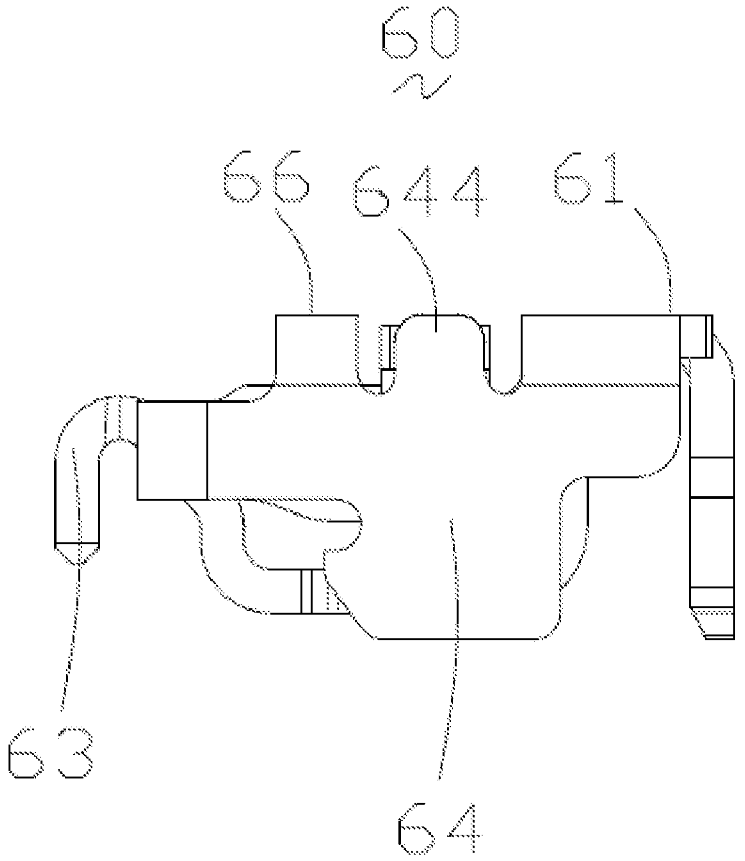
Figure 19:
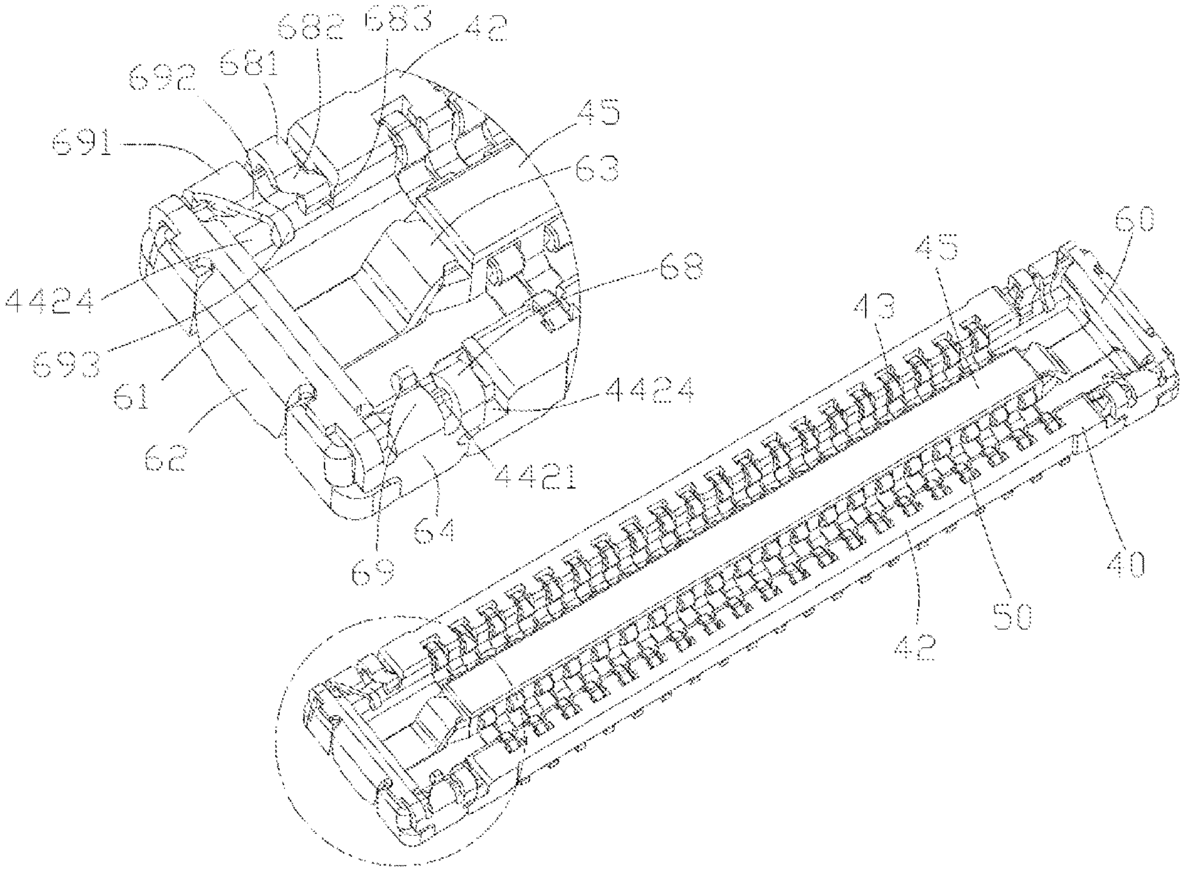
FIG. 19 to FIG. 25 are drawings of the specification of Embodiment 3 of the board-to-board connector assembly according to the present application.
Figure 20:
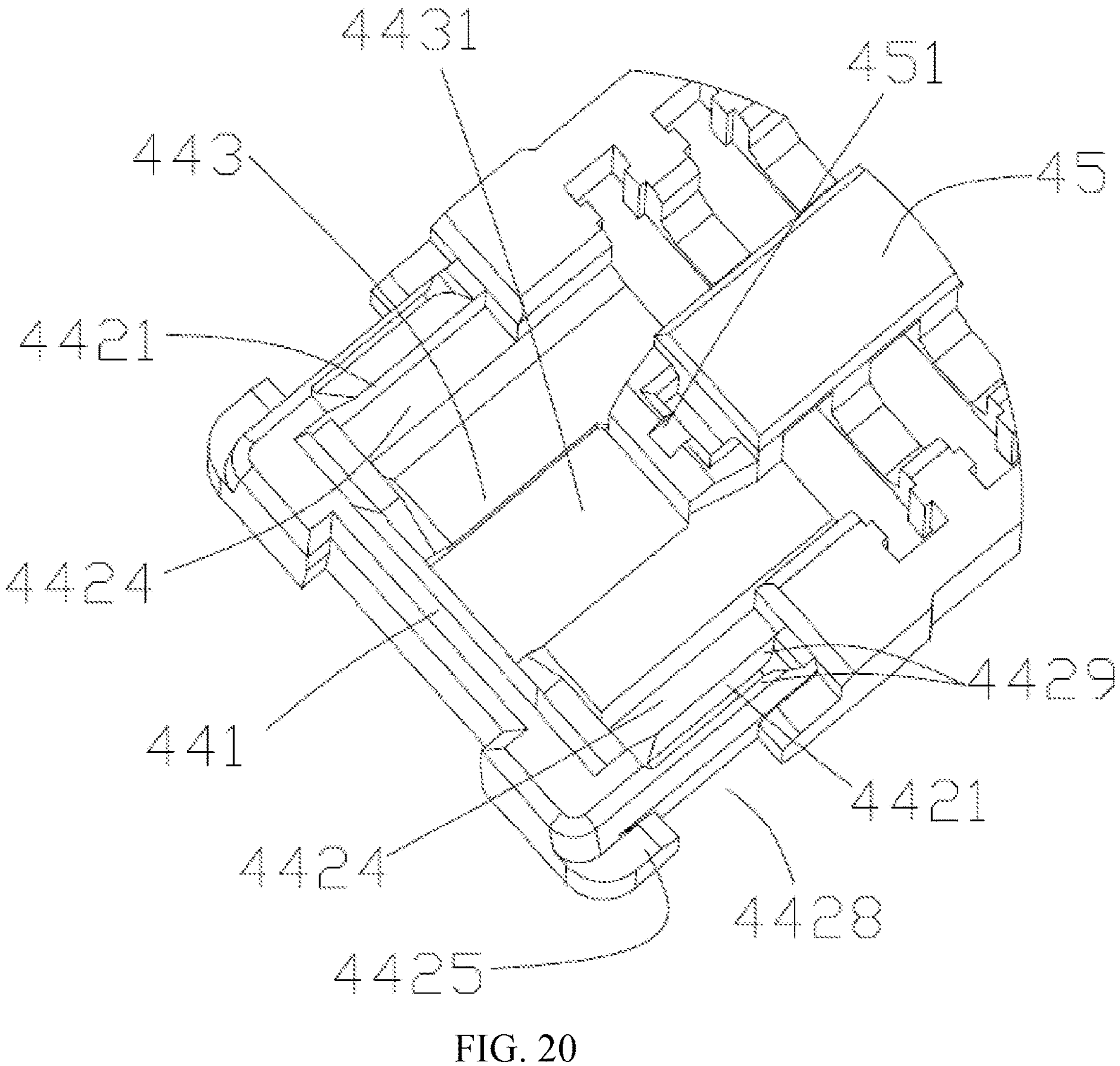
Figure 21:
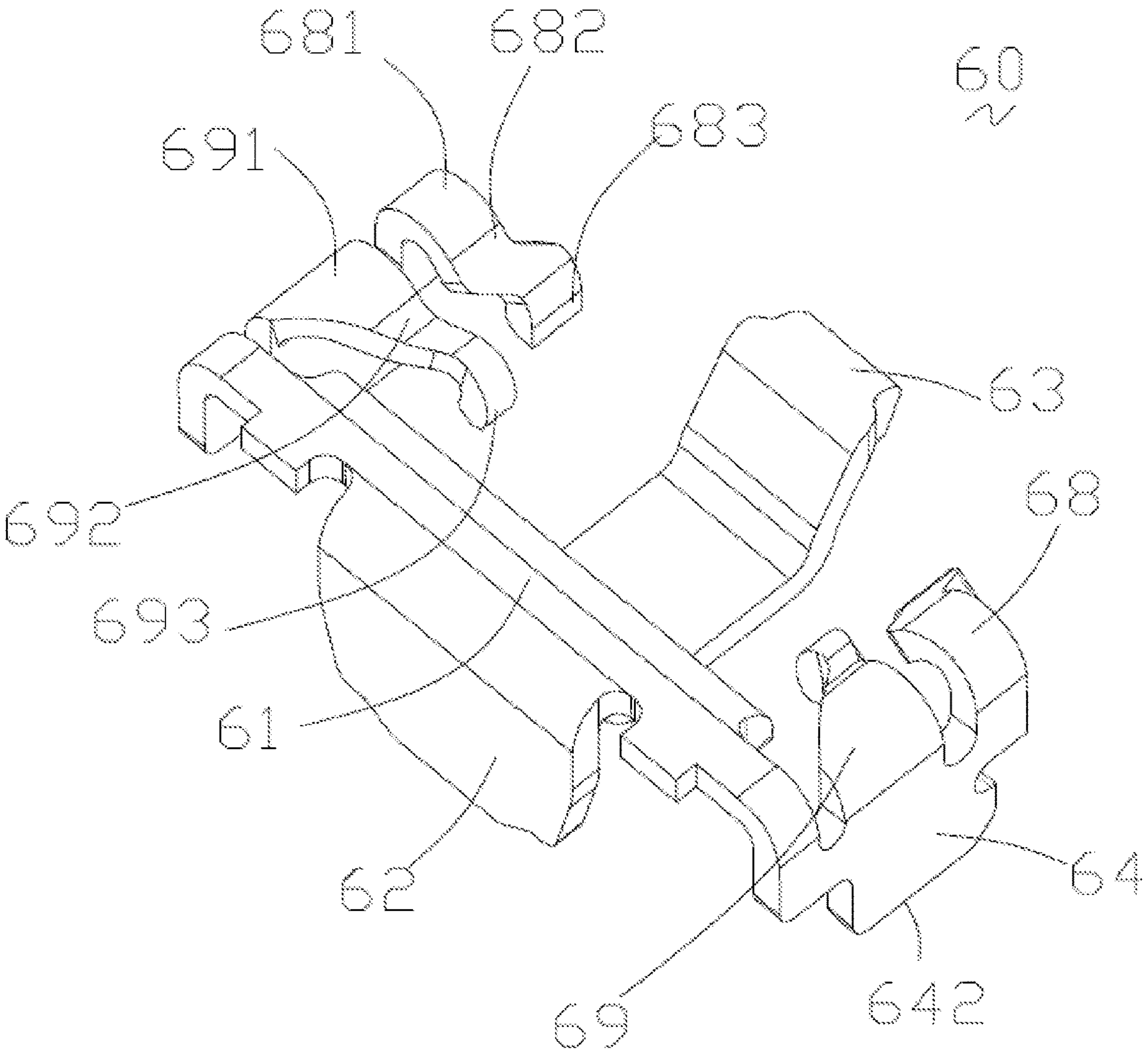
Figure 22:
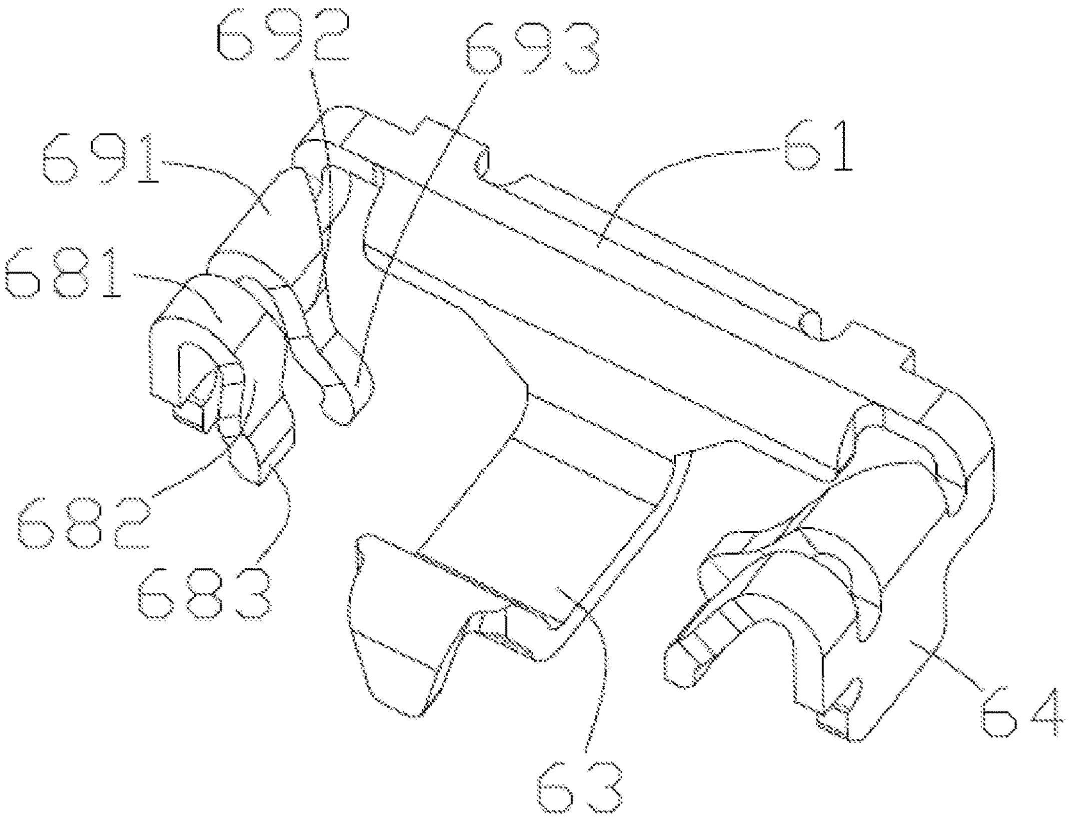
Figure 23:
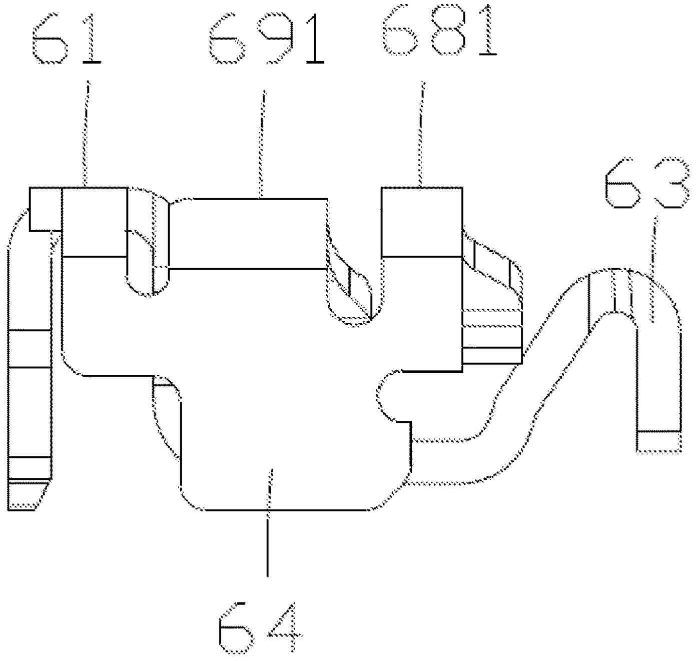
Figure 24:
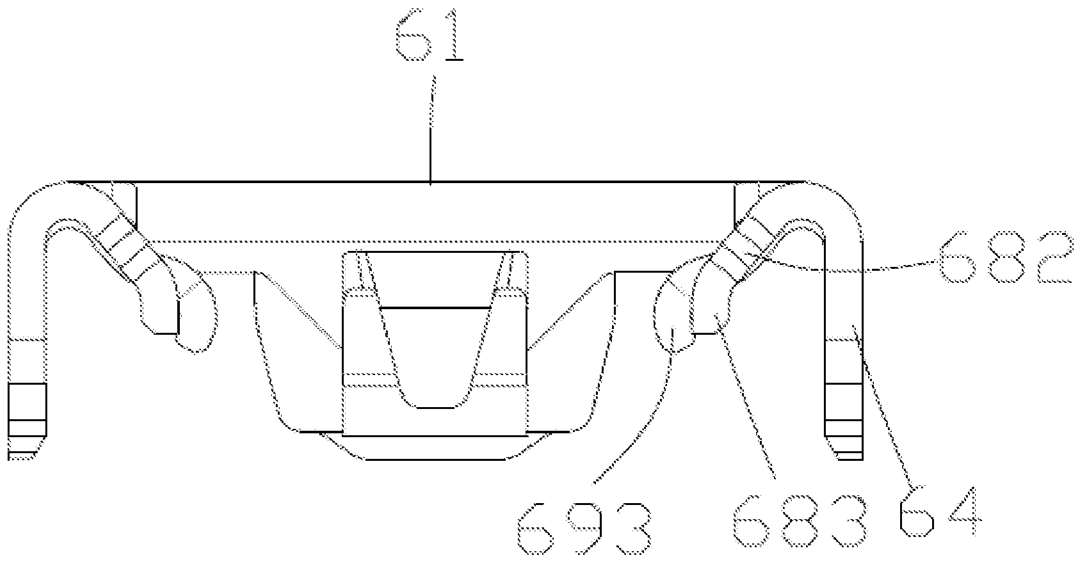
Figure 25:
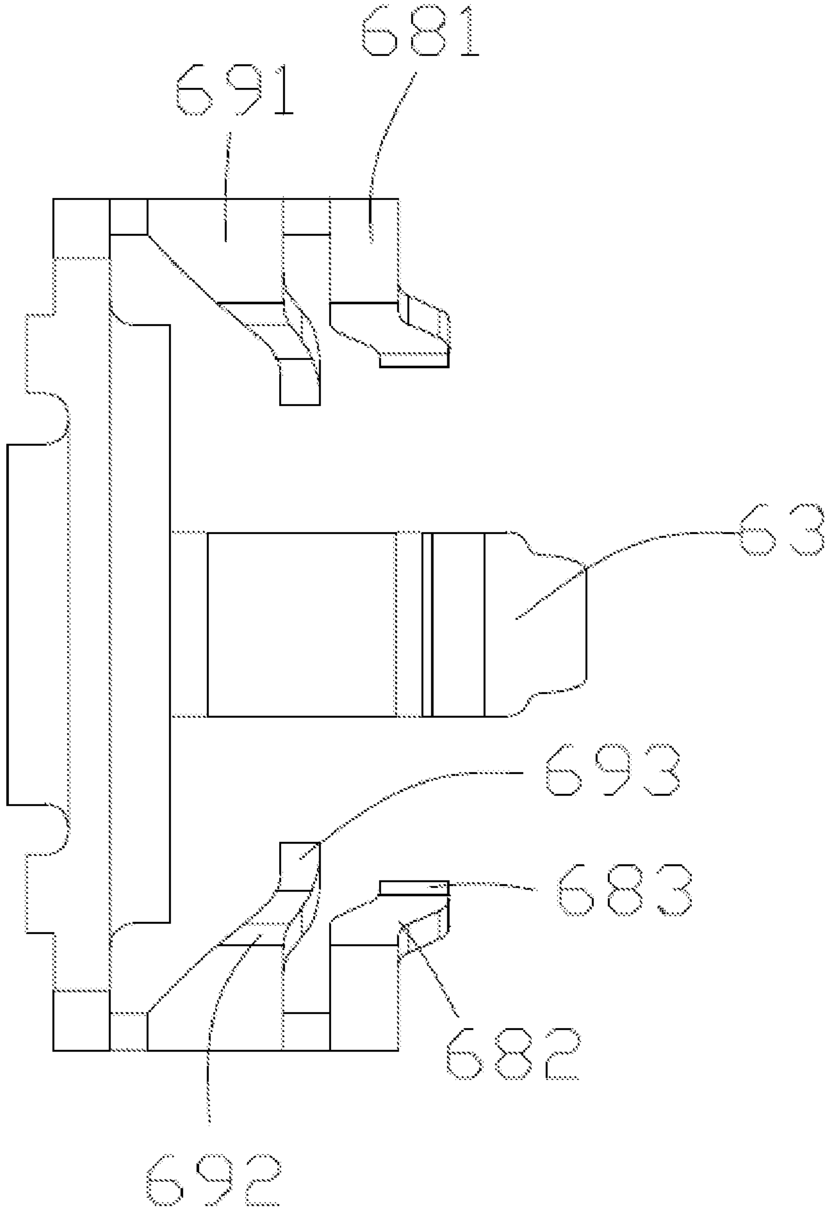

Still refer to FIG. 16 to FIG. 18 which show Embodiment 2 of the board-to-board connector assembly according to the present application. The board-to-board plug A in this embodiment is the same as that in Embodiment 1, and the difference is only in the partial structure of socket strengthener 60.

The difference between Embodiment 2 and Embodiment 1 is as follows. The avoiding notches 643 on the lateral outer peripheral wall covering parts 64 corresponding to the hitching parts 654 in Embodiment 1 are not provided, contacts 644 are formed by protruding and extending upwards from the lateral outer peripheral wall covering parts 64 corresponding to the hitching parts 654, and free ends of the hitching parts 654 are stamped to form small contact tips. When the plug A is inserted into the socket B, the elastic main arms 652 deform toward the longitudinal outer side to force the contact tips 655 of the hitching parts 654 to extend toward the contacts 644 and finally be electrically contacted therewith. In this way, the current can be transferred directly via the contact convex parts 653 of the socket strengthener 60 through the contact parts 331 of the plug strengthener 30 to the contacts 644 on the lateral outer peripheral wall covering parts 64, and be finally transferred to the printed circuit board through the solder pins 642 at the bottoms of the lateral outer peripheral wall covering parts 64. This transfer path is defined as a first transfer path. Thus, the current is not required to be transferred separately via a path of the contact convex parts 653, the elastic main arms 652, the tightening parts 651, and the lateral outer peripheral wall covering parts 64. This transfer path is defined as a second transfer path. Therefore, multi-channel parallel transfer of the plug A and the socket B is realized, heating phenomena are reduced, and the current carrying capability is improved.

It is appropriate that the length by which the contacts 644 extend upwards does not exceed upper surfaces of the main body part 61 and the protection parts 66. The capability of the contacts 644 to tend to deform toward the longitudinal outer sides is retained to prevent damages to the hitching parts 654 and the contacts 644 due to incorrect insertion.

In Embodiment 2, contacts 644 are formed by extending upwards from the lateral outer peripheral wall covering parts 64 corresponding to the hitching parts 654, so that the elastic main arms 652 are electrically contacted with the contacts 644 through the free ends of the hitching parts 654 when deforming toward the longitudinal outer sides during the insertion of the plug A, so as to realize multi-channel current transfer, helping to improve the current bearing capability of the socket strengthener 60.

During a simulated temperature rise test, a temperature rise in Embodiment 1 is 20.4 degrees Celsius, and a temperature rise in Embodiment 2 is 17.4 degrees Celsius when the passing current in Embodiment 1 and Embodiment 2 is 5 amperes.

Embodiment 3

Referring to FIG. 19 to FIG. 25, the plug A in Embodiment 3 is the same as that in Embodiment 1. The socket B is different in that the socket guide parts 44 vary partially, and the structures of the socket strengthener 60 are inconsistent.

In Embodiment 3, the support shoulder 4421 of the socket guide part 44 of the socket body 40 is provided with relief slopes 4429 on two longitudinal sides, so that the top of the support shoulder 4421 is a sharp support top, and the mounting step part 4425 and the elastic relief part 4424 are not required to be communicated through the communicating step part 4426. That is, the communicating step part 4426 is not provided. The remaining structure of the socket step part 44 is the same as that in Embodiment 1.

In addition to including the main body part 61, the central guide part 63, the longitudinal outer peripheral wall covering parts 62, and the lateral outer peripheral wall covering parts 64, the socket strengthener 60 in Embodiment 3 further includes protection arms 68 and elastic contact arms 69 formed by folding and extending inwards and downwards from the top ends of the lateral outer peripheral wall covering parts 64.

The protection arms 68 are formed by bending and extending longitudinally inwards and downwards from the tops of free ends of the lateral outer peripheral wall covering parts 64. The elastic contact arms 69 are formed by bending and extending longitudinally inwards and downwards from the top ends of the lateral outer peripheral wall covering parts 64 located between the protection arms 68 and the main body part 61.

The protection arms 68 include bending protection parts 681 bending from the tops of the lateral outer peripheral wall covering parts 64 toward the longitudinal inner sides and crossing the support shoulder 4421, first extension protection parts 682 formed by extending obliquely downwards from the bending protection parts 681, and second extension protection parts 683 formed by continuously extending obliquely downwards from the first extension protection parts 682 and located above the elastic relief parts 4424. The first extension protection parts 682 and the second extension protection parts 683 are at different extension angles. The extension angle of the first extension protection parts 682 is greater than that of the second extension protection parts 683, so that the first extension protection parts 682 are more quickly close to the plug guide part receiving cavities 443 with a shorter extension angle than the second extension protection parts 683. The extension angles herein are defined as angles between the first and second extension protection parts 682 and 683 and the vertical direction. The first extension protection parts 682 also extend away from the main body part 61.

The elastic contact arms 69 include bending crossing parts 691 bending from the tops of the lateral outer peripheral wall covering parts 64 toward the longitudinal inner sides and crossing the support shoulder 4421, extension arms 692 formed by extending obliquely downwards from the bending crossing parts 691, and contact parts 693 formed by continuously extending obliquely downwards from the extension arms 692 and at least partially located in the elastic plug guide part receiving cavities 443. The extension arms 692 and the contact parts 693 are at different extension angles. The extension angle of the extension arms 692 is greater than that of the contact parts 693, so that the extension arms 692 are more slowly close to the plug guide part receiving cavities 443 with a shorter extension angle than the contact parts 693. The extension arms 692 and the contact parts 693 tilt and extend obliquely toward the protection arms 68.

At the same time, the extension angle of the extension arms 692 is smaller than that of the first extension protection parts 682 so that the first extension protection parts 682 are closer to the plug guide part receiving cavities 443. The extension angle of the contact parts 693 is greater than that of the second extension protection parts 683 so that the contact parts 693 are closer to or enter the plug guide part receiving cavities 443. When the plug A is not inserted, observed from top to bottom, free ends of the contact parts 693 are wholly or at least partially located in the plug guide part receiving cavities 443, and free ends of the second extension protection parts 683 of the protection arms 68 are wholly or at least partially located above the elastic relief parts 4424.

Horizontal positions of the top ends of the bending crossing parts 691 are not higher than that of the top ends of the bending protection parts 681 of the protection arms 68. Optionally, the top ends of the bending crossing parts 691 are lower than the top ends of the bending protection parts 681.

During the insertion of the plug A into the socket B, binding end edges of the lateral outer side face covering parts 33 and the covering base parts 31 of the plug strengthener 30 are first guided by the bending protection parts 681 of the protection arms 68, and are continuously pressed along the bending protection parts 681 to be guided by the first extension protection parts 682. In this case, the extension arms 692 of the elastic contact arms 69 are far away from the plug guide part receiving cavities 443 relative to the first extension protection parts 682, and the extension arms 692 are not required to guide the plug strengthener 30. After the plug strengthener 30 is guided by the first extension protection parts 682, an insertion position of the plug A has basically no deviation, the guiding effect of the second extension protection parts 683 is weakened, pressing is continued, and the contact parts 331 of the horizontal outer face covering parts 33 are elastically contacted with the contact parts 693. After the plug A is buckled, the elastic contact arms 69 deform toward the support shoulder 4421 on the elastic relief parts 4424, and the contact parts 693 are at least partially compressed above the elastic relief parts 4424. The protection arms 68 may not make contact with the plug strengthener 30. The current is transferred to the printed circuit board through the contact parts 331 of the plug strengthener 30, the elastic contact arms 69, and the longitudinal outer peripheral wall covering parts 62.

The relief slopes 4429 on two longitudinal sides of the top end of the support shoulder 4421 can allow the protection arms 68 and the bending protection parts 681 and the bending crossing parts 691 of the elastic contact arms 69 to bend with a small angle and be supported by the support shoulder 4421.

In the board-to-board connector assembly according to this embodiment, tops of the lateral outer peripheral wall covering parts 64 of the socket strengthener 60 bend inwards to form protection arms 68 and elastic contact arms 69 respectively configured for guiding and electrical connection. The protection arms 68 guide and protect the insertion of the plug strengthener 30 without damaging the socket B or the plug.

It is to be noted that the printed circuit board attached to the plug A or socket B in the specification is not limited to the circuit board, provided that it is in line with an object provided with a current transfer line.

The above are only embodiments of the present application and are not intended to limit the present application. The present application may be subject to various changes and variations for those skilled in the art. Any modification, equivalent replacement, improvement etc. made within the spirit and principle of the present application shall fall within the scope of claims of the present application.

What is claimed is:

1. A board-to-board socket, comprising a socket body, a socket terminal and a socket strengthener, wherein the socket body comprises a bottom wall, socket side walls formed by protruding upwards from two longitudinal ends of the bottom wall, socket guide parts formed at two lateral ends of the socket body, and an island part formed by protruding upwards from the bottom wall;

wherein each of the socket guide parts comprises a plug guide part receiving cavity, a longitudinal outer peripheral wall located at a lateral outer side of the plug guide part receiving cavity, and a pair of lateral outer peripheral walls located at two longitudinal sides of the plug guide part receiving cavity;

the socket strengthener comprises a main body part covering an upper surface of the longitudinal outer peripheral wall, lateral outer peripheral wall covering parts which extend from the main body part and cover the pair of lateral outer peripheral walls, and elastic arm parts extending from the lateral outer peripheral wall covering parts to sides of the pair of lateral outer peripheral walls close to the plug guide part receiving cavities; and tops of the elastic arm parts bend and extend towards longitudinal outer sides to form hitching parts hitched at top faces of the pair of lateral outer peripheral walls.

2. The board-to-board socket according to claim 1, wherein the pair of lateral outer peripheral walls of the socket body comprise a support shoulder and an elastic relief part located at a longitudinal inner side of the support shoulder and communicated with the plug guide part receiving cavity, and the elastic arm parts are elastically deformable in a longitudinal direction at the elastic relief part.

3. The board-to-board socket according to claim 2, wherein a mounting step part is formed at a longitudinal outer side of the support shoulder, and the lateral outer peripheral wall covering parts extend to the mounting step part.

4. The board-to-board socket according to claim 2, wherein a communicating step part communicated with the elastic relief part is formed on at least one end of the support shoulder in a lateral direction, and the elastic arm parts comprise: tightening parts bending from lateral ends of the lateral outer peripheral wall covering parts and extending to the communicating step part, and elastic main arms at least partially extending from the tightening parts to the elastic relief part in the lateral direction, and the hitching parts bend outwards in a longitudinal direction from top ends of the elastic main arms and are hitched above the support shoulder.

5. The board-to-board socket according to claim 4, wherein the elastic main arms protrude toward the plug guide part receiving cavities to form contact convex parts, and when observed from top to bottom, the contact convex parts are at least partially located in the plug guide part receiving cavities.

6. The board-to-board socket according to claim 4, wherein top ends of the lateral outer peripheral wall covering parts bend towards the plug guide part receiving cavities to form protection parts supported on the support shoulder.

7. The board-to-board socket according to claim 6, wherein a top of the support shoulder is provided with an upper platform close to the communicating step part, and further provided with a lower groove adjacent to the upper platform, and the protection parts are supported on the upper platform, and the hitching parts are supported in the lower groove.

8. The board-to-board socket according to claim 7, wherein a horizontal position of a surface of the lower groove is lower than that of the upper platform, and upper surfaces of the hitching parts are lower than those of the protection parts.

9. The board-to-board socket according to claim 8, wherein the board-to-board socket is engaged with a board-to-board plug, and when the plug is in an engagement state, observed from top to bottom, free ends of the protection parts do not cover the elastic main arms, and after the plug is inserted into the socket, the protection parts at least partially cover the elastic main arms.

10. The board-to-board socket according to claim 1, wherein protected parts with horizontal positions lower than the island part are provided at two lateral ends of the island part, and the socket strengthener further comprises a central guide part bending downwards from a lateral inner side of the main body part, extending to the protected parts and covering the protected parts.

11. The board-to-board socket according to claim 10, wherein the socket strengthener further comprises longitudinal outer peripheral wall covering parts bending downwards from a lateral outer side of the main body part and covering the longitudinal outer peripheral walls, and bottoms of the longitudinal outer peripheral wall covering parts serve as solder pins for fixing.

12. The board-to-board socket according to claim 10, wherein the plug guide part receiving cavities are provided with a through opening between the protected parts and the longitudinal outer peripheral walls; and the central guide part comprises a first central guide arm bending downwards from the lateral inner side of the main body part and extending to inner side faces of the longitudinal outer peripheral walls, a support bottom arm bending from the first central guide arm and extending to bottoms of the protected parts along the through opening, and a second central guide arm bending from the support bottom arm and extending along the protected parts.

13. The board-to-board socket according to claim 12, wherein each of the protected parts comprises a mesa part having a horizontal plane lower than the island part, a relief slope formed by tilting obliquely downward from the mesa part, and an engaging slot recessed downward from the mesa part; and the second central guide arm extends obliquely upwards along the relief slope, and a tail end of the second central guide arm bends downwards to form a snap-in end part snapped into the engaging slot.

14. The board-to-board socket according to claim 1, wherein the longitudinal outer peripheral wall covering parts are provided with contacts at positions corresponding to the hitching parts, and when the elastic arm parts are compressed along longitudinal outer sides, the hitching parts move towards the longitudinal outer sides to be electrically contacted with the contacts, and at the same time, the elastic arm parts are electrically contacted with a plug strengthener.

15. The board-to-board socket according to claim 14, wherein bottoms of the longitudinal outer peripheral wall covering parts are fixed, as solder pins, to a printed circuit board, a current is transferred from the plug strengthener to the solder pins of the longitudinal outer peripheral wall covering parts through the hitching parts, and the pair of lateral outer peripheral walls of the socket body comprise a support shoulder and an elastic relief part located at a longitudinal inner side of the support shoulder and communicated with the plug guide part receiving cavity, and the elastic arm parts are elastically deformable in the longitudinal direction at the elastic relief part.

16. A board-to-board connector assembly, comprising a socket and a plug engaged with the socket, wherein the plug comprises a plug body, a plug terminal, and a plug strengthener; wherein the plug body comprises a top wall, plug side walls formed by extending downwards from two longitudinal ends of the top wall, plug guide parts formed at two lateral ends of the plug body, and an island part receiving cavity located between the plug side walls and the plug guide parts, wherein the socket comprises a socket body, a socket terminal and a socket strengthener; wherein the socket body comprises a bottom wall, socket side walls formed by protruding upwards from two longitudinal ends of the bottom wall, socket guide parts formed at two lateral ends of the socket body, an island part formed by protruding upwards from the bottom wall, and a plug side wall receiving cavity formed between the island part and the socket side walls, wherein each of the socket guide parts comprises a plug guide part receiving cavity, a longitudinal outer peripheral wall located at a lateral outer side of the plug guide part receiving cavity, and a pair of lateral outer peripheral walls located at two longitudinal sides of the plug guide part receiving cavity, and the socket strengthener comprises a main body part covering a surface of the longitudinal outer peripheral wall, lateral outer peripheral wall covering parts which extend from the main body part and cover the pair of lateral outer peripheral walls, and elastic arm parts extending from the lateral outer peripheral wall covering parts to sides of the pair of lateral outer peripheral walls close to the plug guide part receiving cavities, and tops of the elastic arm parts bend and extend towards longitudinal outer sides to form hitching parts hitched on top faces of the pair of lateral outer peripheral walls, and when the plug is engaged with the socket, the plug strengthener is electrically contacted with the elastic arm parts.

17. The board-to-board connector assembly according to claim 16, wherein the pair of lateral outer peripheral walls of the socket body comprise a support shoulder and an elastic relief part located at a longitudinal inner side of the support shoulder and communicated with the plug guide part receiving cavity, and the elastic arm parts are elastically deformable in a longitudinal direction at the elastic relief part.

18. The board-to-board connector assembly according to claim 17, wherein a mounting step part is formed at a longitudinal outer side of the support shoulder, the lateral outer peripheral wall covering parts extend to the mounting step part, a communicating step part communicated with the elastic relief part is formed on at least one end of the support shoulder in a lateral direction, and the elastic arm parts comprise: tightening parts bending from lateral ends of the lateral outer peripheral wall covering parts and extending to the communicating step part, and elastic main arms at least partially extending from the tightening parts to the elastic relief part in the lateral direction; and the hitching parts bend outwards in the longitudinal direction from top ends of the elastic main arms and are hitched above the support shoulder.

19. The board-to-board connector assembly according to claim 18, wherein the elastic main arms protrude toward the plug guide part receiving cavities to form contact convex parts, and observed from top to bottom, the contact convex parts are at least partially located in the plug guide part receiving cavity.

20. The board-to-board connector assembly according to claim 18, wherein top ends of the lateral outer peripheral wall covering parts bend towards the plug guide part receiving cavities to form protection parts supported on the support shoulder.

* * * * *